United States Patent
Hatasaki et al.

(10) Patent No.: US 8,020,016 B2
(45) Date of Patent: Sep. 13, 2011

(54) METHOD FOR CONTROLLING ELECTRIC POWER OF COMPUTER SYSTEM

(75) Inventors: Keisuke Hatasaki, Kawasaki (JP); Yoshifumi Takamoto, Kokubunji (JP); Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1006 days.

(21) Appl. No.: 11/857,794

(22) Filed: Sep. 19, 2007

(65) Prior Publication Data
US 2008/0294920 A1 Nov. 27, 2008

(30) Foreign Application Priority Data
May 21, 2007 (JP) ................................. 2007-134047

(51) Int. Cl.
*G06F 1/16* (2006.01)
*G06F 1/32* (2006.01)
*G06F 11/30* (2006.01)

(52) U.S. Cl. ........ 713/323; 713/300; 713/310; 713/320; 713/324; 713/330; 713/340

(58) Field of Classification Search ......... 713/300, 713/310, 320, 324, 330, 340, 323
See application file for complete search history.

(56) References Cited

U.S. PATENT DOCUMENTS

| | | | |
|---|---|---|---|
| 5,666,538 A * | 9/1997 | DeNicola | 713/320 |
| 2005/0210304 A1* | 9/2005 | Hartung et al. | 713/320 |
| 2006/0224850 A1 | 10/2006 | Yamamoto et al. | |
| 2007/0245165 A1* | 10/2007 | Fung | 713/320 |
| 2008/0098194 A1* | 4/2008 | Hashimoto et al. | 711/173 |
| 2008/0126702 A1* | 5/2008 | Zimoto et al. | 711/114 |
| 2009/0125667 A1* | 5/2009 | Hatasaki et al. | 711/6 |

FOREIGN PATENT DOCUMENTS

| | | |
|---|---|---|
| JP | 11-73246 A | 3/1999 |
| JP | 2004-258695 A | 9/2004 |
| JP | 2006-285464 A | 10/2006 |

* cited by examiner

*Primary Examiner* — Vincent T Tran
(74) *Attorney, Agent, or Firm* — Mattingly & Malur, PC

(57) ABSTRACT

To reduce the electric power consumption in a computer system having at least one server and at least one data processing apparatus, the data processing apparatus includes an electric power consumption state control module by which electric power consumption of the data processing apparatus can be changed, obtains a use relationship between each server and each processing apparatus included in the computer system, monitors a change in a state of the server, searches for a related data processing apparatus in the use relationship with the server, obtains a state of at least one related server in the use relationship with the related data processing apparatus, determines whether an electric power consumption state of the related data processing apparatus is to be changed or not based on the state of the related server, and changes the electric power consumption state of the related data processing apparatus.

13 Claims, 32 Drawing Sheets

LOGICAL/PHYSICAL MAP TABLE 421

| PHYSICAL DISK | RAID GROUP | LOGICAL DISK |
|---|---|---|
| PDEV0 | GROUP1 | LU0, LU1 |
| PDEV1 | | |
| PDEV2 | GROUP2 | LU2, LU3 |
| PDEV3 | | |
| PDEV4 | | |
| PDEV5 | GROUP3 | LU4, LU5, LU6 |
| PDEV6 | | |

*FIG. 5*

SERVER MANAGEMENT TABLE 610

| SERVER IDENTIFIER | STATUS | LOGICAL DISK |
|---|---|---|
| SERVER1 | ON | LU1(S/D) |
| SERVER2 | ON | LU2(S/D) |
| SERVER3 | ON | LU3(S/D) |
| SERVER4 | OFF | LU4(S), LU5(D) |
| SERVER5 | STANDBY | LU6(S/D) |

*FIG. 7*

STORAGE MANAGEMENT TABLE 611

| RAID GROUP | LOGICAL DISK | STATUS |
|---|---|---|
| GROUP1 | LU0, LU1 | ACTIVE |
| GROUP2 | LU2, LU3 | ACTIVE |
| GROUP3 | LU4, LU5, LU6 | POWER SAVING |

*FIG. 8*

DETERMINATION TABLE 614

| TYPE OF STATE CHANGE | USE STATE UPDATE POLICY |
|---|---|
| ON | +1 |
| OFF | -1 |
| SUSPEND | -1 |
| RESUME | +1 |
| DISK UNMOUNT | -1 |
| DISK MOUNT | +1 |
| END OF APPLICATION | -1 |
| START OF APPLICATION | +1 |
| DISCONNECTION OF STORAGE PATH | -1 |
| CONNECTION OF STORAGE PATH | +1 |
| OCCURRENCE OF FAILURE | -1 |
| START OF MAINTENANCE | -1 |
| END OF MAINTENANCE | +1 |
| TRANSFER OF VIRTUAL SERVER (SOURCE) | -1 |
| TRANSFER OF VIRTUAL SERVER (DESTINATION) | +1 |

*FIG. 18*

SERVER MANAGEMENT TABLE 610

| SERVER IDENTIFIER 701 | STATUS 702 | LOGICAL DISK 703 | ELECTRIC POWER CONSUMPTION STATE CHANGE POLICY 704 |
|---|---|---|---|
| SERVER1 | ON | LU1(S/D) | POWER SAVING STATE1 |
| SERVER2 | ON | LU2(S/D) | POWER SAVING STATE2 |
| SERVER3 | ON | LU3(S/D) | POWER SAVING STATE3 |
| SERVER4 | OFF | LU4(S), LU5(D) | POWER SAVING STATE1 |
| SERVER5 | STANDBY | LU6(S/D) | POWER SAVING STATE1 |

FIG. 19

SERVER MANAGEMENT TABLE

| PHYSICAL SERVER IDENTIFIER (704) | VIRTUAL SERVER IDENTIFIER (705) | STATUS (702) | LOGICAL DISK (703) |
|---|---|---|---|
| SERVER1 | VIRTUAL SERVER1 | ON | LU1(S/D) |
| | VIRTUAL SERVER2 | ON | LU2(S/D) |
| SERVER2 | VIRTUAL SERVER3 | ON | LU3(S/D) |
| | VIRTUAL SERVER4 | OFF | LU4(S), LU5(D) |
| SERVER3 | VIRTUAL SERVER5 | STANDBY | LU6(S/D) |
| | VIRTUAL SERVER6 | STANDBY | LU6(S/D) |

METHOD FOR CONTROLLING ELECTRIC POWER OF COMPUTER SYSTEM

CLAIM OF PRIORITY

The present application claims priority from Japanese patent application JP 2007-134047 filed on May 21, 2007, the content of which is hereby incorporated by reference into this application.

BACKGROUND OF THE INVENTION

This invention relates to a control method for electric power consumption of a computer system.

The electric power consumption of data processing devices constituting a computer system such as servers, external storage systems, network switches, and load balancers is increasing as the performance thereof increases accordingly. Therefore, in the computer system, costs for supplying electric power and cooling of the data processing devices increase more and more.

As a method for reducing the electric power consumption of the computer system, there is a method to supply only necessary ones of the data processing devices in the computer system with the electric power.

However, in order to realize the above method, it is necessary to determine whether a data processing device requires the electric power supply or not, and, according to the conventional method, it is necessary to manually select the data processing device to be turned on. As a result, in an autonomous system in which operation states of data processing devices dynamically change, it is difficult to properly provide a proper instruction to turn on the data processing devices, resulting in an inferior efficiency in the reduction of the electric power consumption, and labor for providing a proper instruction.

SUMMARY OF THE INVENTION

It is therefore an object of this invention to reduce electric power consumption of a computer system in which multiple data processing devices are connected via networks.

It is another object of this invention to identify necessary data processing devices in a computer system, to supply only the identified necessary data processing devices with electric power, and thus to reduce the electric power consumption of the computer system.

A representative aspect of this invention is as follows. That is, there is provided an electric power control method of controlling electric power consumption of a computer system, the method being carried out on a computer system comprising at least one server and at least one data processing apparatus, wherein the data processing apparatus comprises an electric power consumption control module for changing electric power consumption. The electric power control method comprising: a relationship management step of managing a use relationship between the at least one server and the at least one data processing apparatus included in the computer system; a state monitoring step of monitoring a change in a state of the at least one server; a relationship search step of searching for a related data processing apparatus in the use relationship with the at least one server; a state determination step of obtaining a state of at least one related server in the use relationship with the related data processing apparatus, and determining whether the electric power consumption of the related data processing apparatus is to be changed or not based on the state of the at least one related server; and an electric power consumption control step of changing the electric power consumption of the related data processing apparatus.

According to this invention, it is possible to identify necessary data processing devices in a computer system, to supply only the identified necessary data processing devices with electric power, and thus to reduce the electric power consumption of the computer system.

BRIEF DESCRIPTION OF THE DRAWINGS

The present invention can be appreciated by the description which follows in conjunction with the following figures, wherein:

FIG. 5 is an explanatory diagram showing a logical/physical map table in accordance with the first embodiment of this invention;

FIG. 7 is an explanatory diagram showing a server management table in accordance with the first embodiment of this invention;

FIG. 8 is an explanatory diagram showing a storage management table in accordance with the first embodiment of this invention;

FIG. 18 is an explanatory diagram showing a determination table in accordance with the second embodiment of this invention;

FIG. 19 is an explanatory diagram showing a server management table in accordance with a third embodiment of this invention;

FIG. 34 is an explanatory diagram showing a server management table in accordance with the ninth embodiment of this invention.

DETAILED DESCRIPTION OF THE PREFERRED EMBODIMENTS

A description will now be given of embodiments of this invention with reference to drawings.

The embodiments described below are exemplary embodiments according to this invention, and respective combinations thereof can also be embodiments of this invention. Moreover, the embodiments described below are not intended to restrict the scope of this invention.

First Embodiment

Figure 1:
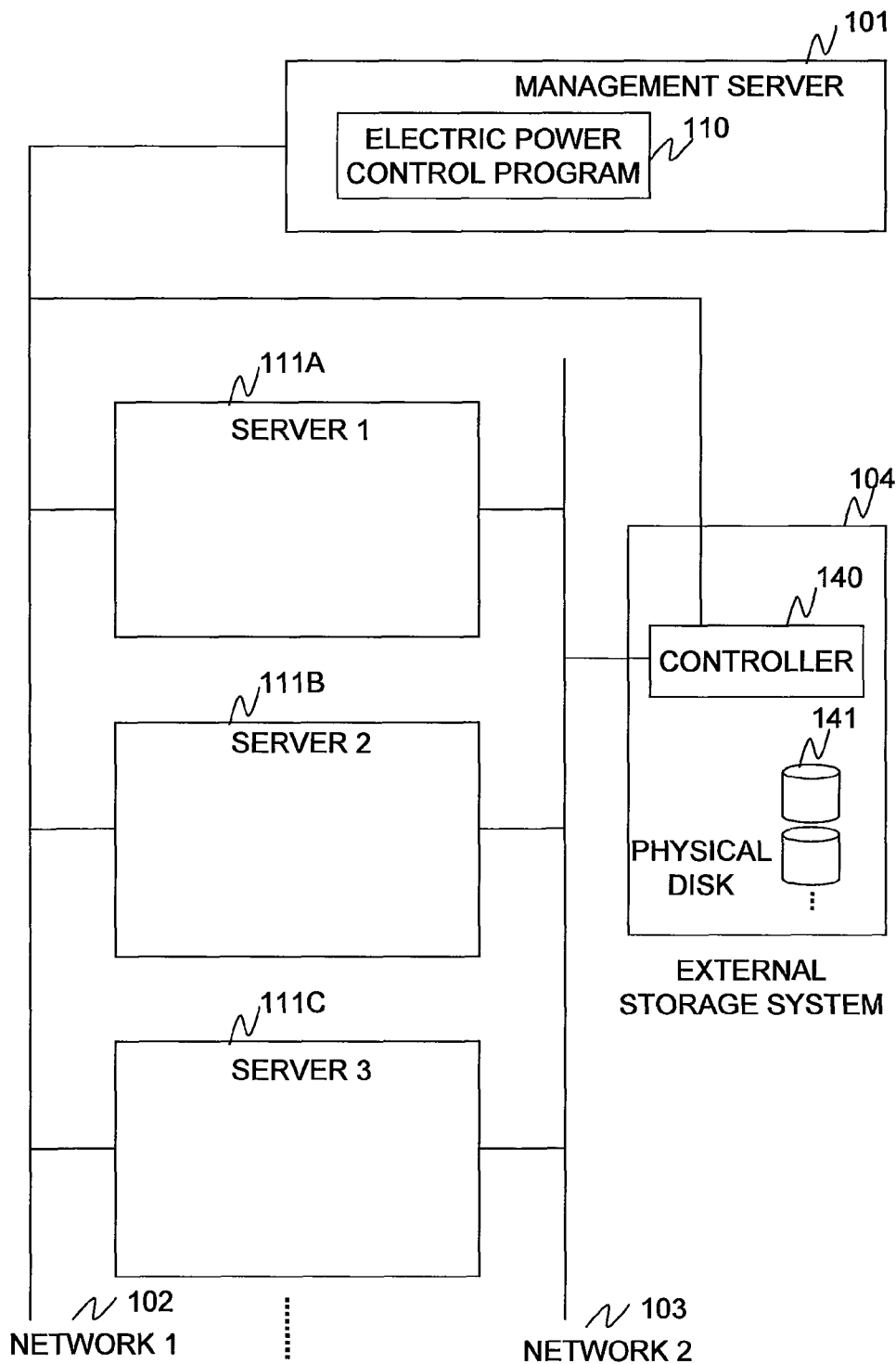
FIG. 1 is a block diagram showing a configuration of a computer system in accordance with a first embodiment of this invention.

FIG. 1 is a block diagram of a configuration of a computer system according to a first embodiment of this invention.

The computer system includes servers 111 (111a-111b), an external storage system 104, and a management server 101. Moreover, they are connected to a network 1 (102) and a network 2 (103). The network 1 (102) and the network 2 (103) may provide a connection form as the Ethernet, which communicates according to the TCP/IP, for example. Moreover, the network 2 (103) may be a Fibre Channel network. Further, though, in FIG. 1, the network 1 (102) and the network 2 (103) are independent, it is not necessary to provide separate networks, and the network 1 (102) and the network 2 (103) may be connected as a single network. The management server 101 includes an electric power control program 110. The external storage system 104 includes physical disks 141 and a controller 140. The servers 111 and the external storage system 104 according to the embodiment of this invention are described by way of example, and the numbers thereof are not intended to limit this invention. Moreover, the numbers of the management server 101 and the electric power control program 110 may be more than one.

Figure 2:
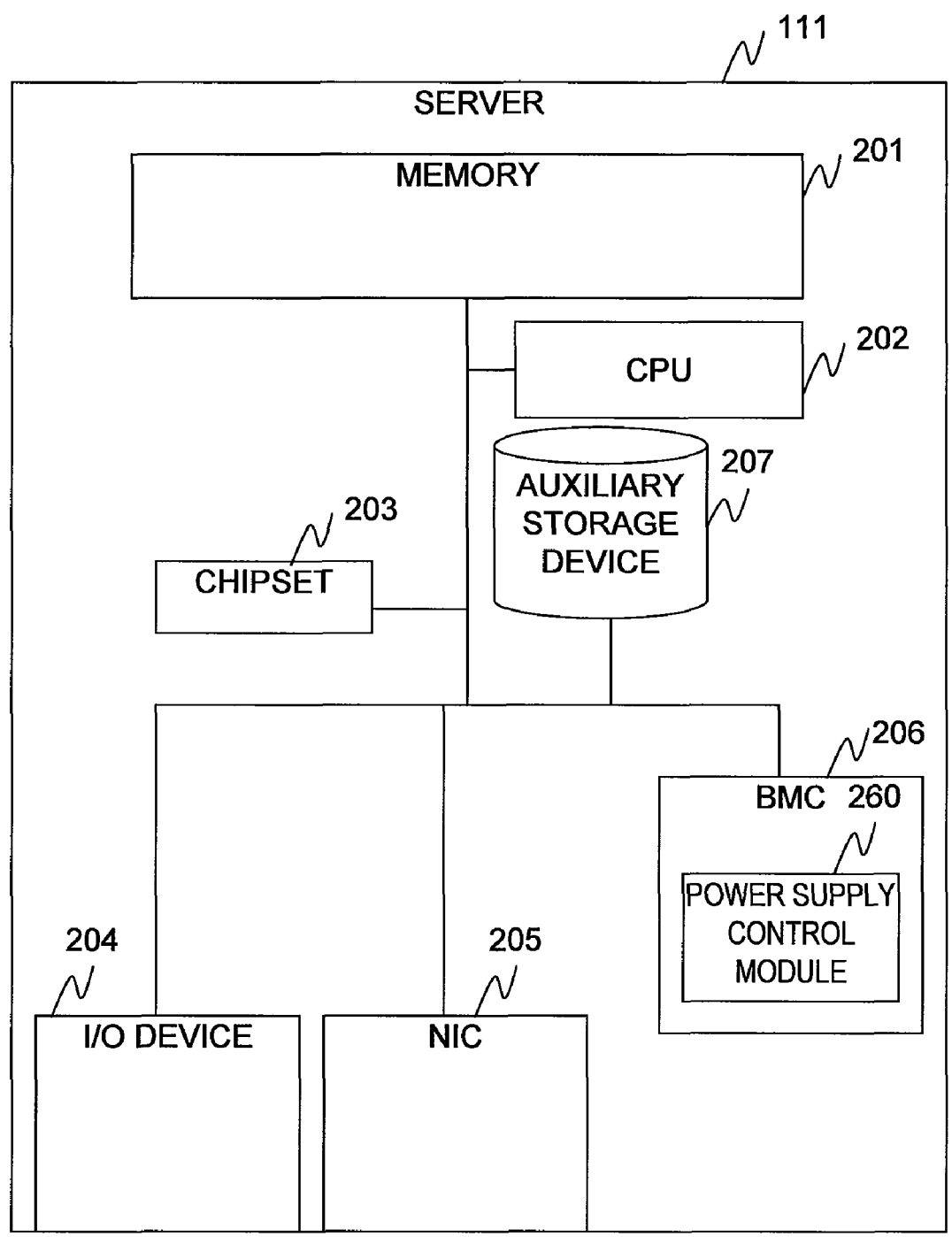
FIG. 2 is a block diagram showing a configuration of a server in accordance with the first embodiment of this invention.

FIG. 2 is a block diagram of a configuration of the server 111 according to the first embodiment of this invention.

The server 111 includes a memory 201, a CPU 202, a chip set 203, an I/O device 204, an NIC 205, a BMC 206, and an auxiliary storage device 207.

The memory 201 stores programs such as an OS and application programs. The CPU 202 executes programs stored in the memory 201. It should be noted that the number of the CPU 202 may be one or more. The chipset 203 is a chip including peripheral circuits of the CPU 202. The I/O device 204 is connected to the network 1 (102), and an interface such as a host bus adaptor (HBA) or a network interface card (NIC) the type of which depends on the protocol used on the network 1 (102). The NIC 205 is an interface used to connect to the network 2 (103). It should be noted that an NIC may be provided in the I/O device 204 independently of the NIC 205. The baseboard management controller (BMC) 206 monitors a state of the server 111, and provides power supply control for the server 111. Moreover, the BMC 206 includes a power supply control function 260. The power supply control function 260 provides control for externally turning on and off a power supply of the server 111 via the NIC 205. The auxiliary storage device 207 is a storage device such as a hard disk or a flash memory. It should be noted that the server 111 does not necessarily include all the components shown in FIG. 2, and has to include at least the CPU 202, the memory 201, and the I/O device 204.

Figure 3:
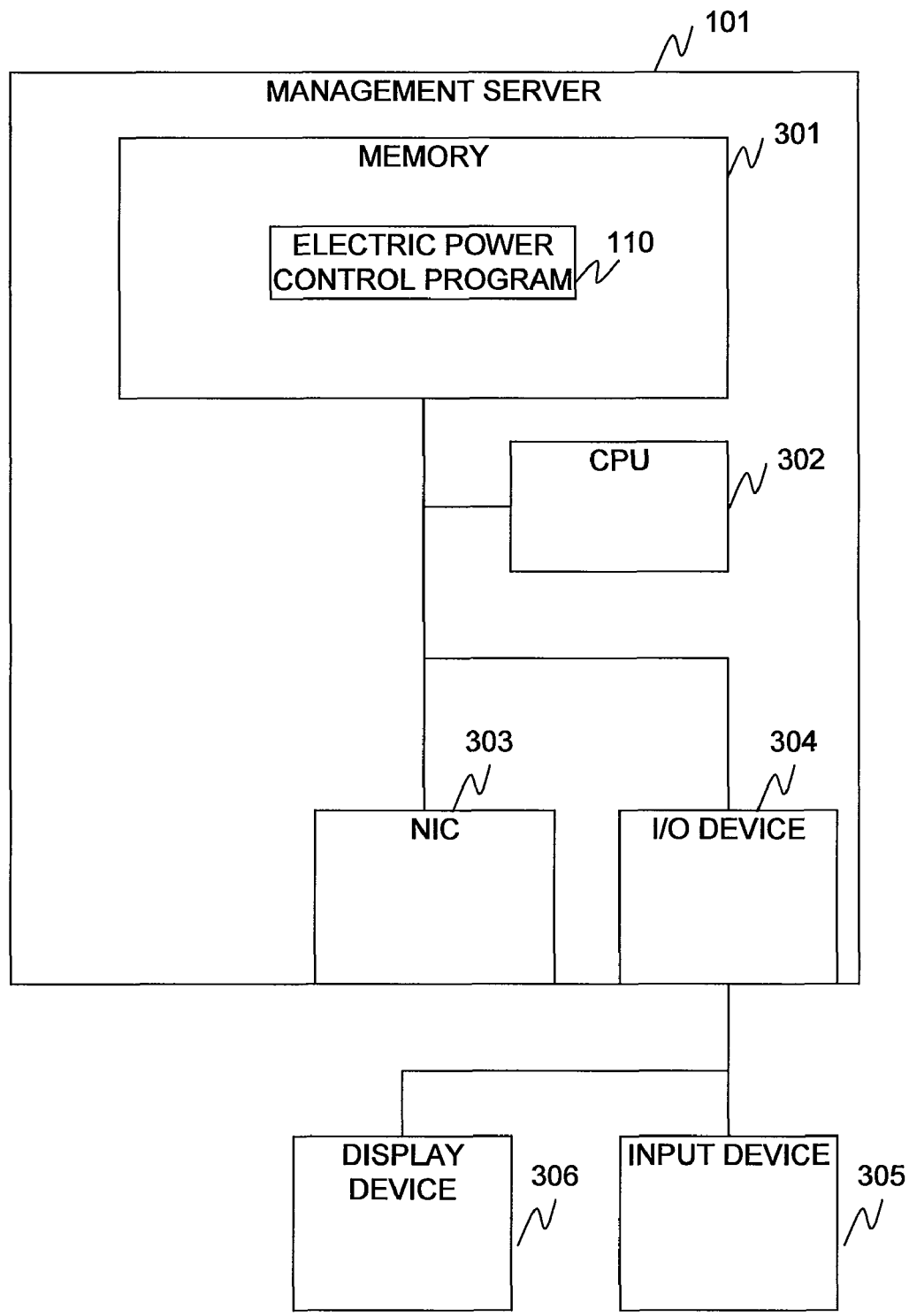
FIG. 3 is a block diagram showing a configuration of a management server in accordance with the first embodiment of this invention.

FIG. 3 is a block diagram of a configuration of the management server 101 according to the first embodiment of this invention.

The management server 101 includes a memory 301, a CPU 302, an NIC 303, and an I/O device 304.

The memory 301 stores an electric power control program 110. The CPU 302 executes a program stored in the memory 301. It should be noted that the number of the CPU 302 may be two or more. The NIC 303 is an interface used to connect to the network 2 (103). The I/O device 304 is an interface for input and output of information to and from the management server 101. Moreover, to the I/O device 304, an input device 305 such as a mouse and a keyboard, and a display device 306 such as a display are connected. Further, to the I/O device 304, an external storage device (such as a USB medium) may be connected for reading and writing information stored in the external storage device. It should be noted that the management server 101 may include a hard disk or an auxiliary storage device (such as a flash memory).

Figure 4:
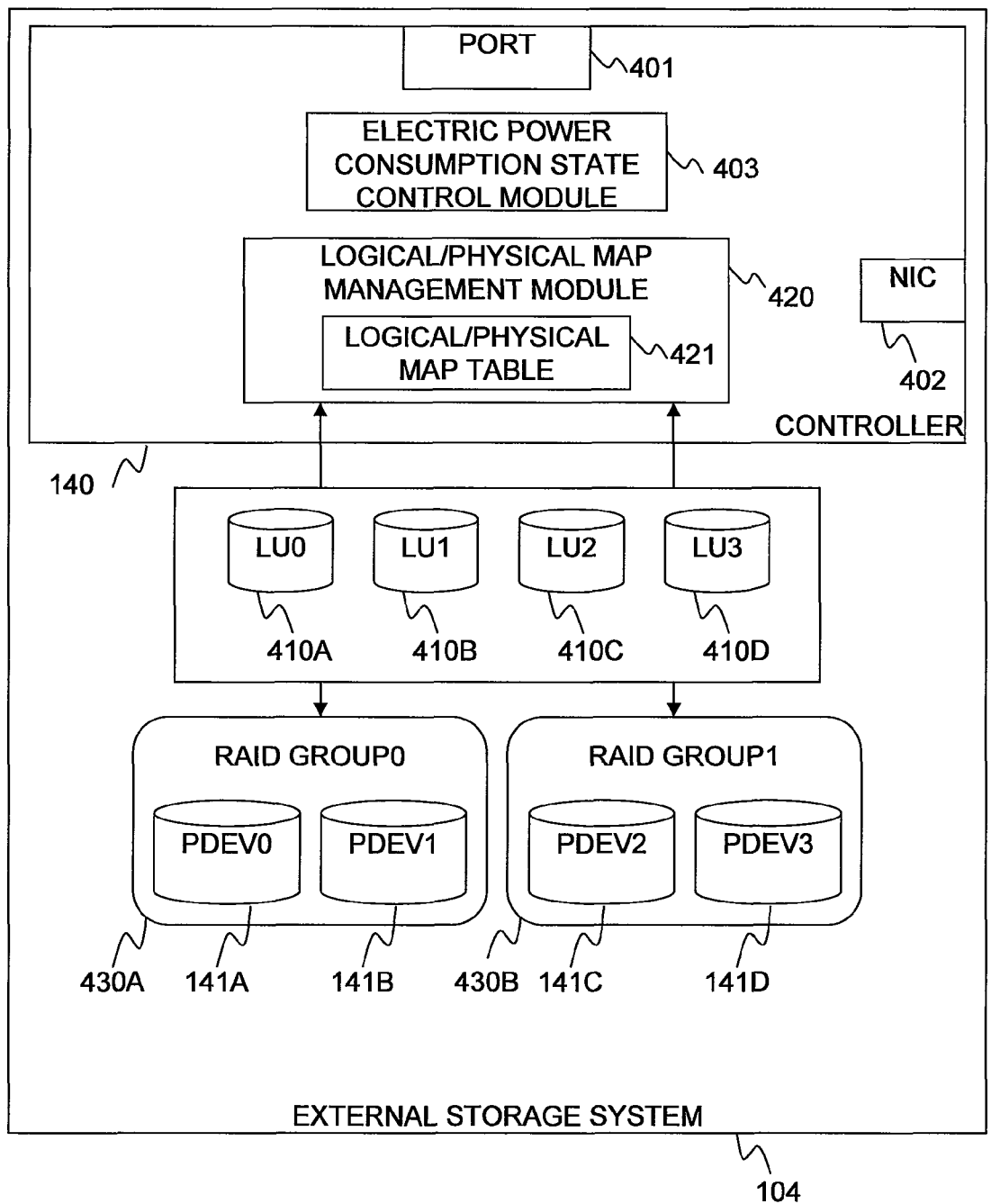
FIG. 4 is a block diagram showing a configuration of an external storage system in accordance with the first embodiment of this invention.

FIG. 4 is a block diagram of a configuration of the external storage system 104 according to the first embodiment of this invention.

It should be noted that the external storage system 104 according to the first embodiment of this embodiment is configured as redundant arrays of inexpensive disks (RAID). The external storage system 104 includes a controller 140 and multiple physical disks 141. The controller 140 includes a port 401, an NIC 402, an electric power consumption state control module 403, and a logical/physical map management module 420.

The port 401 is an interface for connection to the servers 111 via the network 1 (102) thereby providing access to the physical disks 141. Moreover, the NIC 402 is an interface for connection to the management server 101 via the network 2 (103) thereby allowing the electric power control program 110 of the management server 101 to control the external storage system 104.

The electric power consumption state control module 403 changes an operation state of the physical disk 141 thereby changing electric power consumption of the physical disk 141. Moreover, the electric power consumption state control module 403 includes an interface, and receives an instruction to change an electric power consumption state of the physical disk 141 from the electric power control program 110 of the management server 101 connected via the NIC 402. It should be noted that technologies for changing the electric power consumption state of the physical disk 141 include a method of reducing the rotational speed of a drive, a method of changing the state of the drive to a stop state, and a method of changing a state of a head to a rest state, for example.

The logical/physical map management module 420 includes a logical/physical map table 421. The logical/physical map table 421 retains relationships between the physical disks 141 and the logical disks 410. The controller 140 includes a processor and a storage device such as a memory. The memory stores programs for the logical/physical map management module 420 and the electric power consumption state control module 403. As a result of execution of the stored programs by the processor, a process is realized. Moreover, the electric power consumption state control module 403 and the logical/physical map function 420 may be totally or partially implemented by hardware such as a custom processor or the like.

According to the first embodiment of this invention, a group of the physical disks 141 constitute RAID groups 430. The RAID group 430 is a logical group of at least one physical disk 141, and is defined by the logical/physical map management module420, and relationships between the physical disks 141 and the RAID group 430 are retained in the logical/physical map table 421. It should be noted that the respective physical disks 141A to 141D bear identifies: PDEV0, PDEV1, PDEV2, and PDEV3. Moreover, the logical/physical map management module 420 can configure multiple RAID groups 430 as one or more logical disks 410 used as servers 101. The server 111 connected to the port 401 makes access to a physical disk 141 of the external storage system 104 by making access to the logical disk 410. The relationships between the RAID group 430 and the logical disks 410 are retained in the logical/physical map table 421. It should be noted that the respective logical disks 410A to 410D bear identifies LU0, LU1, LU2, and LU3.

The logical/physical map management module 420 configures the RAID groups 430 and the logical disks 410 according to the contents retained in the logical/physical map table 421. Moreover, the external storage system 104 according to the first embodiment of this invention controls the electric power consumption state of the RAID group 430 as the minimum module. If the external storage system 104 is not configured into RAID groups, the physical disk 141 may be a unit of the control for the electric power consumption state. Moreover, the entire external storage system 104 may be a unit of the control of the electric power consumption state. Further, the electric power consumption state control module 403 may include an interface for reporting the unit of the control of the electric power consumption state to the power control program 110 of the management server 101 connected via the NIC 402.

FIG. 5 describes the logical/physical map table 421 according to the first embodiment of this invention.

The logical/physical map table 421 retains relationships among the physical disks 141 included in the external storage system 104, the RAID groups 430, and the logical disks 410. The logical/physical map table 421 includes physical disks 501, RAID groups 502, and logical disks 503.

The physical disk 501 is an identifier of a physical disk 141. The RAID group 502 is an identifier of a RAID group 430 containing the physical disks 141 identified by the physical disks 501.

The logical disk 503 is an identifier of a logical disk 410 contained in the RAID group 430 identified by the RAID group 502.

The logical disk 503 is described as "LU0, LU1" when one RAID group 430 contains multiple logical disks 410. It should be noted that a part of the information in the logical/physical map table 421 is not necessarily indispensable.

Figure 6:
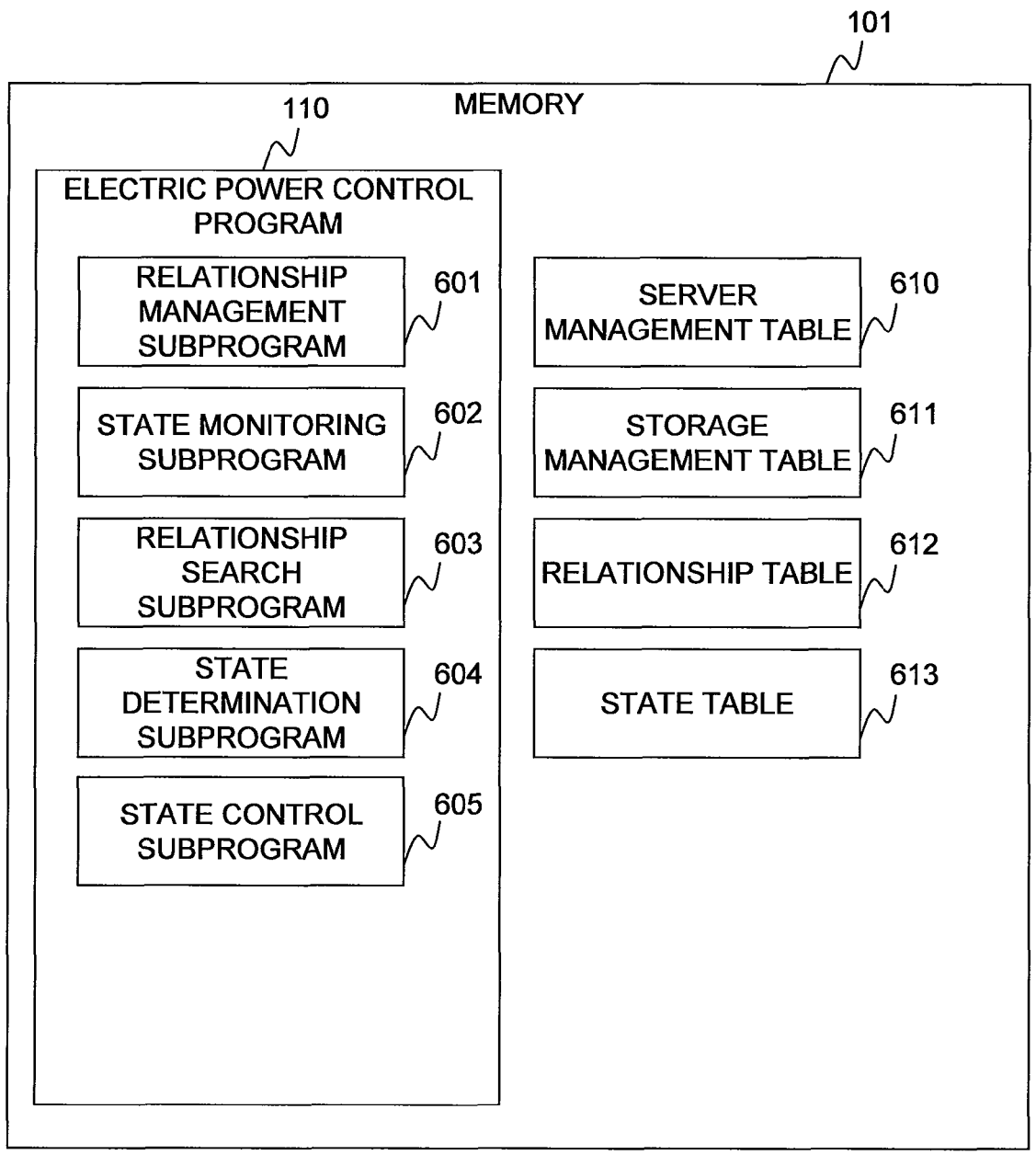
FIG. 6 is a block diagram showing a configuration of a memory of the management server in accordance with the first embodiment of this invention.

FIG. 6 is a block diagram of a configuration of the memory 301 of the management server 101 according to the first embodiment of this invention.

The memory 301 includes an electric power control program 110, a server management table 610, a storage management table 611, a relationship table 612, and a state table 613. The electric power control program 110 includes a relationship management subprogram 601, a state monitoring subprogram 602, a relationship search subprogram 603, a state determination subprogram 604, and a state control subprogram 605.

The relationship management subprogram 601 manages the relationships between the servers 111 of the computer system and the RAID groups 430 of the external storage systems 104. The state monitoring subprogram 602 monitors a change in the state of the servers 111. The relationship search subprogram 603 searches for RAID groups 430 in use relation with a server 111. On this occasion, the use relationship implies a relationship between the servers 111 and the configurations (RAID groups 430, physical disks 141, and logical disks 410) of the external storage system 104 associated by the sever management table 610, the storage management table 611, and the relationship table 612, which are described later. The state determination subprogram 604 determines whether an electric power consumption state of a RAID group 430 is to be changed or not. The state control subprogram 605 changes an electric power consumption state of a RAID group 430 if the electric power consumption state of the RAID group 430 is to be changed.

The server management table 610 retains information of the servers 111 constituting the computer system. The storage management table 611 retains information on the external storage system 104 included in the computer system. The relationship table 612 retains the relationships between the servers 111 and the RAID groups 430. The state table 613 retains information on the use state of the respective RAID groups 430. It should be noted that the electric power control program 110 and the components thereof may be partially or entirely implemented by a custom processor as hardware.

FIG. 7 describes the server management table 610 according to the first embodiment of this invention.

The server management table 610 includes server identifiers 701, states 702, and logical disks 703.

The server identifier 701 is an identifier of a server 111. The state 702 is a state of the server 111 identified by the server identifier 701. For example, when the power supply of the server 111 is turned on, the state 702 is "ON", and when the server 111 is in a standby state, the state 702 is "STANDBY". On this occasion, the standby state implies a cold standby state of the server 111, for example. The cold standby implies a state in which the server 111 is in a standby state, and starts up on a failure, resulting in a switch of processing. Though, in FIG. 7, only the states of "ON", "OFF", and "STANDBY" are shown, in addition to these states, states such as reboot, standby, suspend, resume, disk unmount, disk mount, end of application, start of application, disconnection of storage path, connection of storage path, occurrence of failure, start of maintenance, completion of maintenance, and transfer of virtual server may be described.

The logical disk 703 includes identifiers and applications of logical disks 410 used by the server 111 identified by the server identifier 701. For example, when a server 111 uses the logical disk 410 LU1, the logical disk 703 is "LU1". The application thereof is indicated as additional information enclosed by parentheses, and "S" denotes a system disk application, and "D" denotes a data disk application. Moreover, a logical disk 410 used for both of the applications bears a description of "S/D".

It should be noted that the system disk application implies applications in which a disk is used for starting up a system, and which includes executable files for an OS or applications, system data, log files, and swap files. Moreover, the data disk application implies applications in which a disk is used to retain data subject to processing by applications, which includes customer lists and bookkeeping information. On this occasion, if the data disk application is shown as the additional information of a logical disk 410, there may be provided a configuration to immediately start up the logical disk 410 in a power saving state. It should be noted that a part of the information in the server management table 610 is not necessarily indispensable.

FIG. 8 describes the storage management table 611 according to the first embodiment of this invention.

The storage management table 611 includes RAID groups 801, logical disks 802, and states 803.

The RAID group 801 is an identifier of a RAID group 430 of the external storage system 104. The logical disk 802 is an identifier of a logical disk 410 contained in the RAID group 430 identified by the RAID group 801. For example, if both the logical disks 410 LU0 and LU1 are contained in the RAID group 430, the logical disk 802 bears a description of "LU0, LU1".

The state 803 is an electric power consumption state of the RAID group 430 identified by the RAID group 801. For example, the state 803 bears a description "ACTIVE" during an operation at the maximum performance, and a description "POWER SAVING" in a power saving state. On this occasion, the "ACTIVE" state of a RAID group 430 is a state in which the RAID group 430 consumes a large electric power and provides a high access performance, for example.

Moreover, the "POWER SAVING" state is a state in which the RAID group 430 is operating at a low electric power consumption with a control technology for the electric power consumption of the external disk 104 (at least one physical disk 141 constituting the RAID group 430 is not rotating, for example). It should be noted that the electric power saving state may not be a single state. For example, it is possible to register different levels of the electric power saving state such as a level for stopping only the disk, a level for stopping a controller other than the disk and the head portion, and a level for stopping completely the disk and the controller. Moreover, the states 803 depend on the technology for controlling the electric power consumption of the external storage system 104, so it is only necessary for the technology to distinguish among the electric power consumption states of the RAID group 430.

Figure 9:
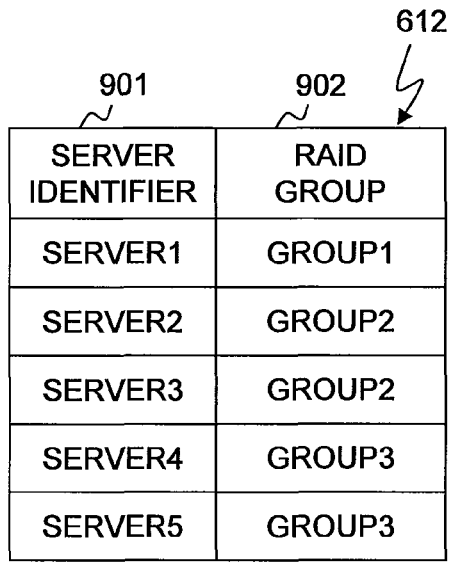
FIG. 9 is an explanatory diagram showing a relationship table in accordance with the first embodiment of this invention.

FIG. 9 describes the relationship table 612 according to the first embodiment of this invention.

The relationship table 612 includes server identifiers 901 and RAID groups 902. The server identifier 901 is an identifier of a server 111. The RAID group 902 is an identifier of a RAID group 430 of the external storage system 104 accessed by the server 111 identified by the server identifier 901.

Figure 10:
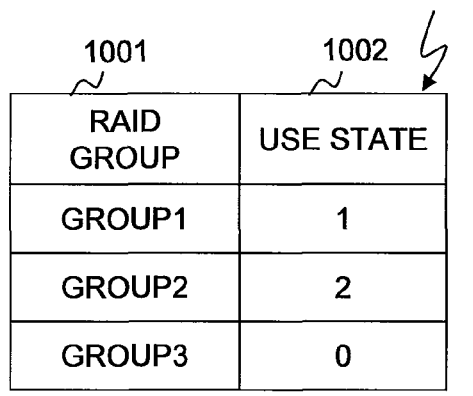
FIG. 10 is an explanatory diagram showing a state table in accordance with the first embodiment of this invention.

FIG. 10 describes the state table 613 according to the first embodiment of this invention.

The state table 613 includes RAID groups 1001 and use states 1002. The RAID group 1001 is an identifier of a RAID group 430 of the external storage system 104. The use state 1002 is a use state of the RAID group 430 identified by the RAID group 1001. Specifically, the use state 1002 is the number of servers 111 presently using the RAID group 430, and if the use state 1002 is "0", there is no server 111 presently using the RAID group 430, and it is thus possible to change the electric power consumption state of the physical disks 141 of the RAID group 430 to states such as stopping or slowing down the rotation of physical disks 141 of the RAID group 430.

A description will now be given of a process executed by the electric power control program 110 according to the first embodiment of this invention.

Figure 11:
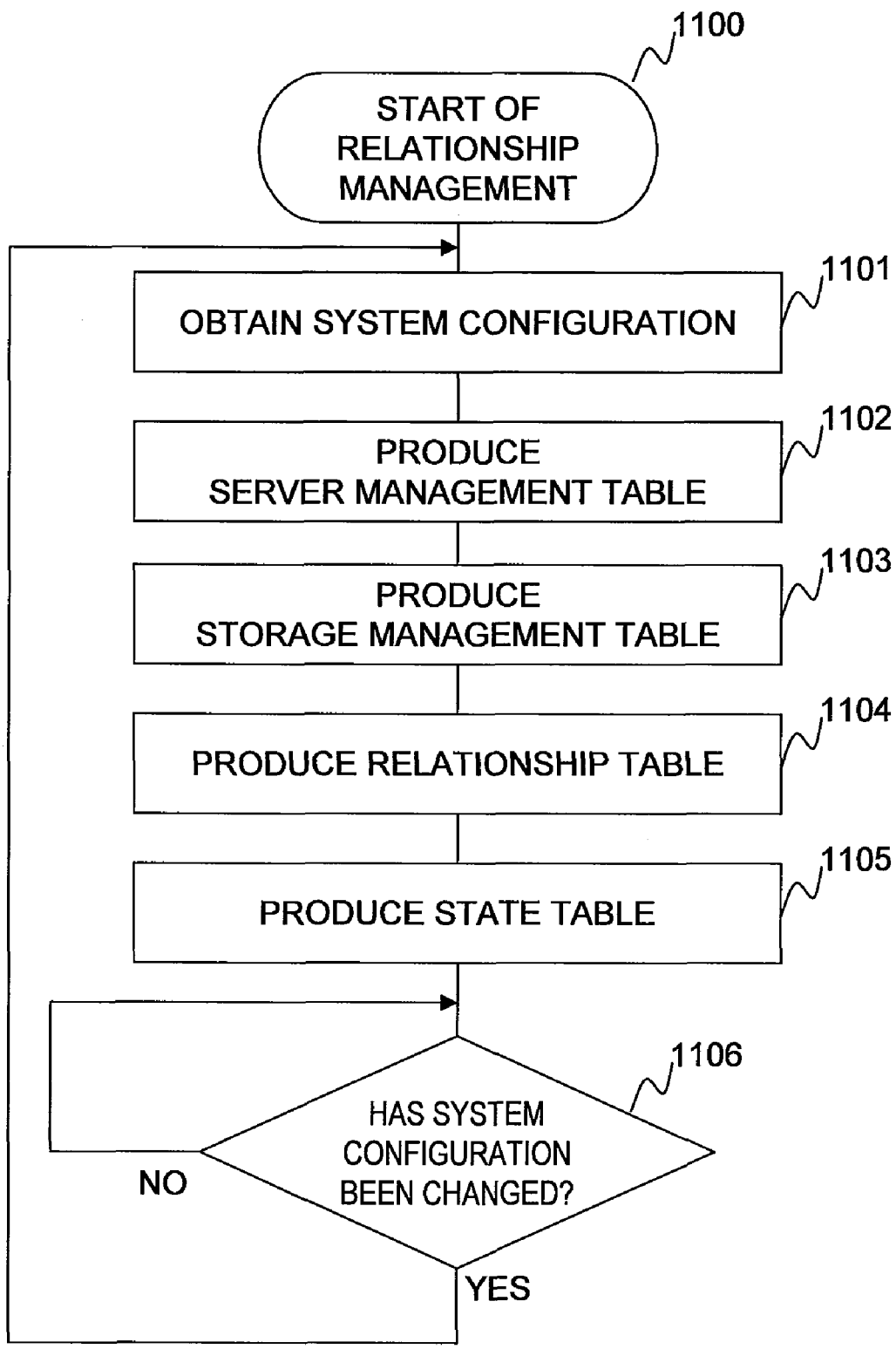
FIG. 11 is a flowchart showing a process executed by a relationship management subprogram in accordance with the first embodiment of this invention.

FIG. 11 is a flowchart showing a process executed by the relationship management subprogram 601 according to the first embodiment of this invention.

First, in a step 1101, the relationship management subprogram 601 obtains the relationships of the servers and the data processing devices included in the computer system and the states of the respective data processing devices. The relationships of the data processing devices obtained in the step 1101 include, for example, a relationship between a server 111 included in the computer system and logical disks 410 of the external storage system 104 used by the server 111, a relationship between a server 111 and RAID groups 430 which include logical disks 410 used by the server 111, and a relationship between a server 111 and physical disks 141 constituting a RAID group 430 used by the server 111.

Moreover, the obtained states of data processing device(s) include operation states of the data processing device. Moreover, the relationship management subprogram 601 may obtain additional information if necessary. It should be noted that information which cannot be obtained, or which is not necessary may not be obtained.

Then, in a step 1102, the relationship management subprogram 601 produces a server management table 610 based on the relationships of the data processing devices and the states of the data processing devices obtained in the step 1101. Specifically, the relationship management subprogram 601 produces a server management table 610 based on the states of the servers 111, and the logical disks 410 used by the servers 111.

Then, in a step 1103, the relationship management subprogram 601 produces a storage management table 611 based on the relationships of the data processing devices and the states of the data processing devices obtained in the step 1101. Specifically, the relationship management subprogram 601 produces a storage management table 611 based on the states of the RAID groups 430, and the logical disks 410 included in the RAID groups 430.

Then, in a step 1104, the relationship management subprogram 601 produces a relationship table 612 based on the server management table 610 produced in the step 1102 and the storage management table 611 produced in the step 1103. Specifically, the relationship management subprogram 601 refers to the server management table 610 to obtain identifiers 703 of the logical disks 410 used by a server 111. Moreover, the relationship management subprogram 601 refers to the storage management table 611 to obtain an identifier 801 of the RAID group 430 including the logical disks 410 the identifiers 703 of which are obtained. As a result, the relationship management subprogram 601 can obtain relationships between the server 111 and the RAID group 430. The relationship management subprogram 601 repeats this process for the respective servers 111 included in the computer system to produce the relationship table 612.

Then, in a step 1105, the relationship management subprogram 601 produces a state table 613 based on the relationship table 612 produced in the step 1104 and the information contained in the server management table 610. Specifically, the relationship management subprogram 601 refers to the relationship table 612 to obtain identifiers 901 of servers 111 using the respective RAID groups 430. Further, the relationship management subprogram 601 obtains states 702 of the servers 111 identified by the obtained identifiers 901 by referring to the server management table 610. Then, the relationship management subprogram 601 sets the number of servers 111 using the respective RAID groups 430 as a value of the use state 1002 of the respective RAID groups 430 in the state table 613.

On this occasion, the state that a server 111 is using the RAID group 430 implies the server 111 and the RAID group 430 are related with each other, and the server 111 using the RAID group 430 is in the "ON" state. Moreover, this state may also include a state which apparently shows that a server 111 is using a RAID group 430.

For example, according to the state table 613 shown in FIG. 9, the RAID group 902 identified by "GROUP 2" is used by the servers 111 identified by the identifiers 901 "SEVER 2" and "SERVER 3". Based on this, lines identified by the server identifiers 701 "SERVER 2" and "SERVER 3" in the server management table 610 shown in FIG. 7 shows that both of the servers are "ON", and, thus, the use state 1002 in a line identified by the identifier "GROUP 2" of the RAID group 902 in the state table 613 shown in FIG. 10 is "2".

Then, in a step 1106, the relationship management subprogram 601 detects whether there is a change in the configuration of the computer system. If the configuration has been changed, the relationship management subprogram 601 returns to the step 1101, and if the configuration has not been changed, the relationship management subprogram 601 repeats the process in the step 1106 until the configuration has been changed. On this occasion, the change in the configuration of the computer system includes a change in the number of the data processing devices included in the computer system and a change in a logical setting thereof. For example, the change includes a case in which a server 111 is added or removed, a case in which a RAID group 430 is added or removed, and a case in which a physical disk 141 included in a RAID group 430 is added or removed. It should be noted that a method for detecting a change in the system configuration is realized by reporting a change in the system configuration. For example, when the system configuration is changed, a management program may report the change. An administrator who has changed the system configuration may report the change. A program which monitors the system configuration may detect a change in the system configuration.

It should be noted that the method to obtain the information on the data processing devices may be input by the administrator of the computer system via a graphical user interface (GUI) provided by the electric power control program 110 in the step 1101 as described later with reference to FIG. 12. Moreover, the administrator may input the information on the data processing devices from a command line provided by the electric power control program 110. Moreover, the information on the data processing devices may be obtained from files stored in a storage device connected to the management server 101. Moreover, the information on the data processing devices may be obtained via a network.

Moreover, in the step 1101, the states of the respective data processing devices are obtained as the unit of control of the electric power consumption. For example, since the electric power consumption of the external storage system 104 according to this embodiment is controlled while the RAID group 430 is considered as a unit, as shown in FIG. 8, the storage management table 611 retains the information on the respective RAID groups 430. It should be noted that the data processing device (such as the external storage system 104) may have an interface for reporting the minimum unit for the control of the electric power consumption. In this case, in the step 1101, the interface may be used to obtain the information on the minimum unit for the control of the electric power consumption.

Figure 12:
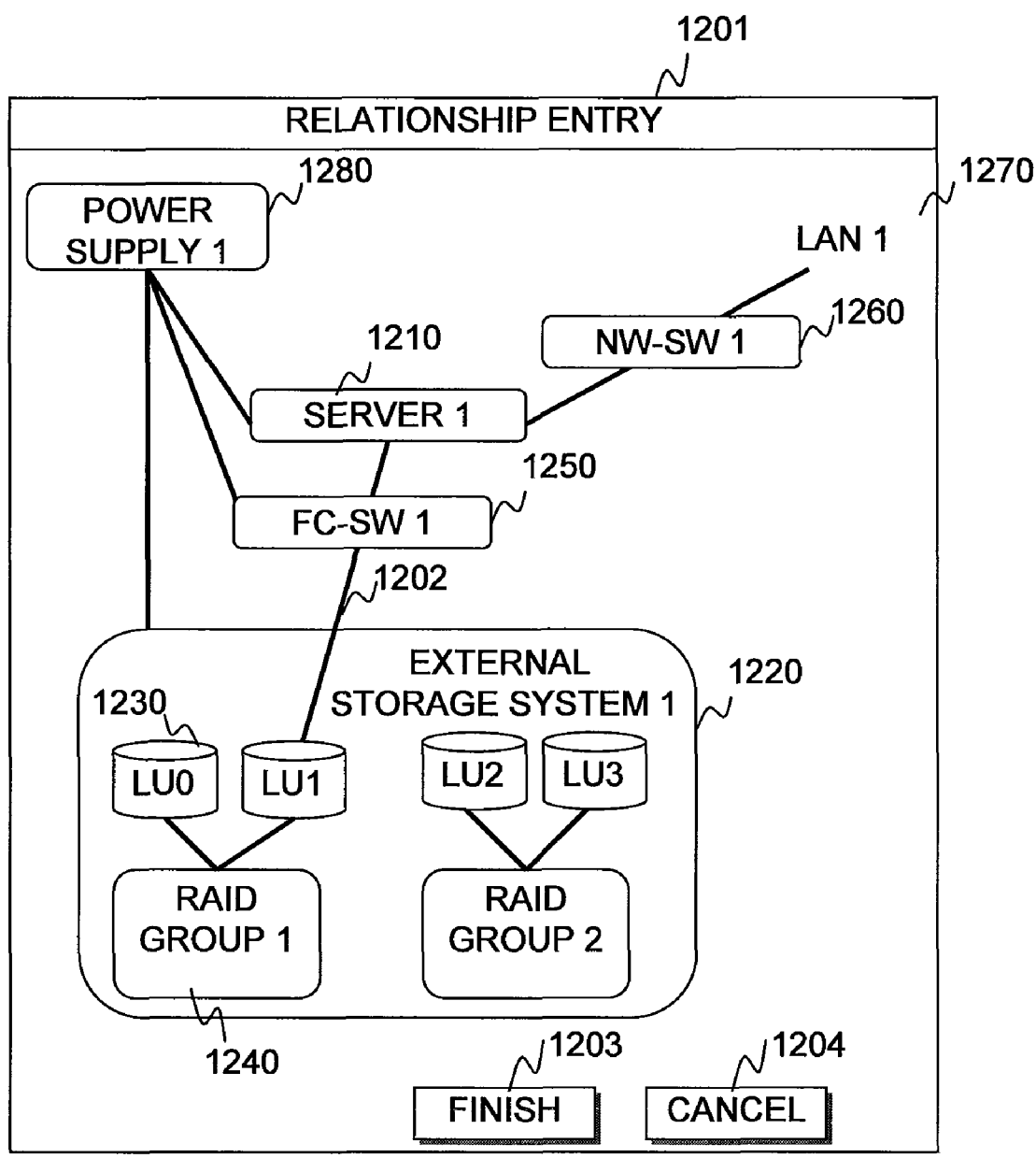
FIG. 12 is an explanatory diagram showing an example of a GUI in order to obtain information on data processing device(s) in accordance with the first embodiment of this invention.

FIG. 12 shows an example of the GUI provided by the electric power control program 110 in order to obtain the information on the data processing devices in the step 1101 in FIG. 11.

The GUI shows relationships between the respective data processing devices (such as relationships between a data processing device and all servers in a use relationship with the data processing device) by means of a browser or a dedicated program on the display device 306 shown in FIG. 3 or another display device via a network.

A window 1201 shows a window of the browser or the dedicated program. The window 1201 shows the external storage system, the logical disks, the RAID groups, a power supply device, the network switch, and the fiber channel switch, which are the servers and the data processing devices constituting the computer system, and the relationships between the respective data processing devices are input by the administrator by connecting the respective data processing devices with each other with relationship lines 1202 by means of the input device 305 (such as a mouse).

For example, in FIG. 12, the identifiers of the respective data processing devices and the relationships between the respective data processing devices are shown. A SERVER 1 (1210) is using a logical disk LU1 (1230) of an EXTERNAL STORAGE SYSTEM 1 (1220) via a fiber channel switch FC-SW 1 (1250), and the LU1 (1230) is included in a RAID GROUP 1 (1240). Moreover, the SERVER 1 (1210) is connected to a LAN 1 (1270) via a network switch NW-SW 1 (1260). Moreover, FIG. 12 also shows that the SERVER 1 (1210), the FC-SW 1 (1250), and the EXTERNAL STORAGE SYSTEM 1 (1220) are using a POWER SUPPLY 1 (1280). It should be noted that the window 1201 shows the information obtained from a management program of the respective data processing devices or interfaces provided by the data processing devices themselves. After the input is finished, the administrator operates a FINISH button 1203. On the other hand, if the administrator wants to cancel the input, the administrator operates a CANCEL button 1204.

Figure 13:
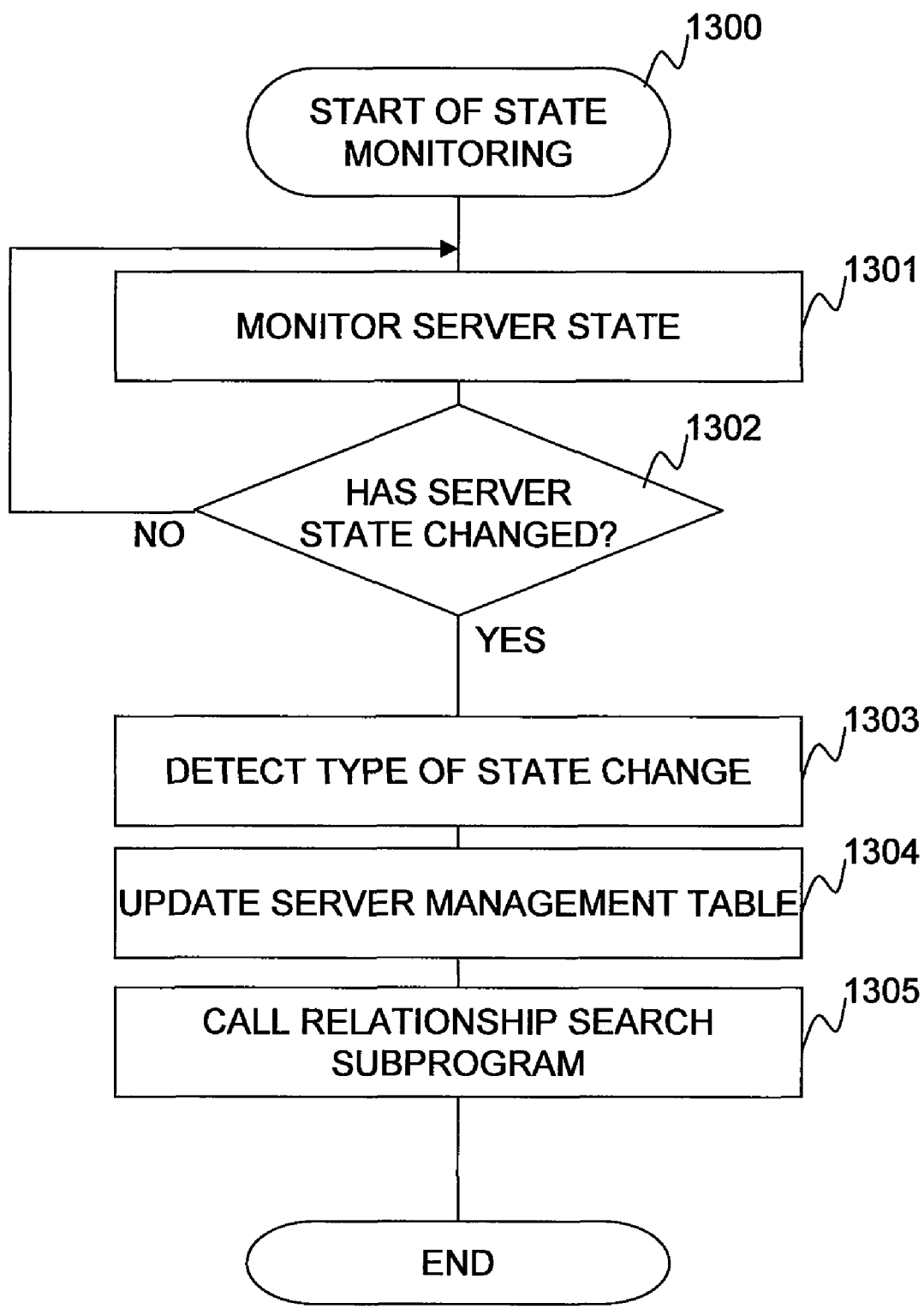
FIG. 13 is a flowchart showing a process executed by a state monitoring subprogram in accordance with the first embodiment of this invention.

FIG. 13 is a flowchart showing a process executed by the state monitoring subprogram 602 according to the first embodiment of this invention.

In a step 1301, the state monitoring subprogram 602 monitors the state of the server 111. The method for monitoring the state of the server 111 includes, for example, a method for receiving a state change message from the management program of the server 111, a method for collecting information by means of a monitoring interface (such as SNMP), and a method for asking the BMC 206 installed on the server 111 for the state.

In a step 1302, the state monitoring subprogram 602 determines whether the state of the server 111 has changed. If the state monitoring subprogram 602 determines that the state of the server 111 has changed, the state monitoring subprogram 602 proceeds to a step 1303, and if the state monitoring subprogram 602 determines that the state has not been changed, the state monitoring subprogram 602 returns to the step 1301 and monitors the state of the server 111.

Then, in the step 1303, the state monitoring subprogram 602 detects a type of the change in the state of the server 111. For example, a change occurs when the power supply of the server 111 is turned on to off, or a failure occurs to the server 111. On this occasion, a difference between before and after the change in the state of the server 111 is retained as difference information of the change in the state of the server 111 in the memory 201 or the auxiliary storage device 207, and the retained difference information is to be referred to by the state determination subprogram 604.

Then, in a step 1304, the state monitoring subprogram 602 updates the state of the server 111 in the server management table 610 based on the information obtained in the step 1303.

In a step 1305, the state monitoring subprogram 602 calls the relationship search subprogram 603 with the server 111 state of which has changed as an argument.

Figure 14:
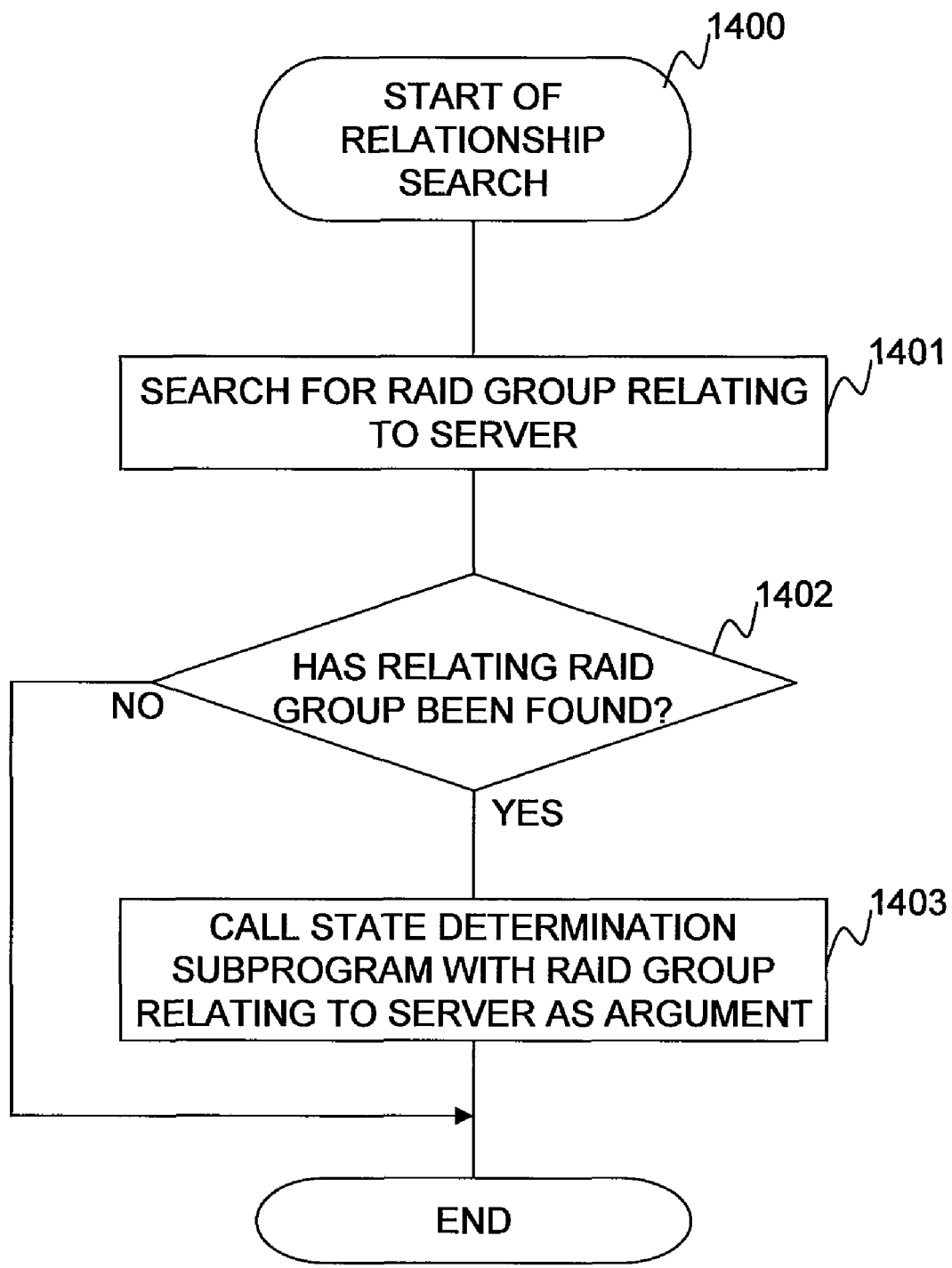
FIG. 14 is a flowchart showing a process executed by a relationship search program in accordance with the first embodiment of this invention.

FIG. 14 is a flowchart showing a process executed by the relationship search program 603 according to the first embodiment of this invention.

In a step 1401, the relationship search program 603 refers to the relationship table 612 based on the identifier of a server 111 obtained from the state monitoring subprogram 602, and searches for a RAID group 430 in use relationship with this server 111.

In a step 1402, the relationship search program 603 determines whether a RAID group 430 in use relationship with the server 111 has been found. If a related RAID group 430 is found, the relationship search program 603 proceeds to a step 1403, and if a related RAID group 430 is not found, the relationship search process is finished.

In the step 1403, the relationship search program 603 calls the state determination subprogram 604 with the identifier of the server 111, and the identifier of the RAID group 430 relating to the server 111 as arguments.

Figure 15:
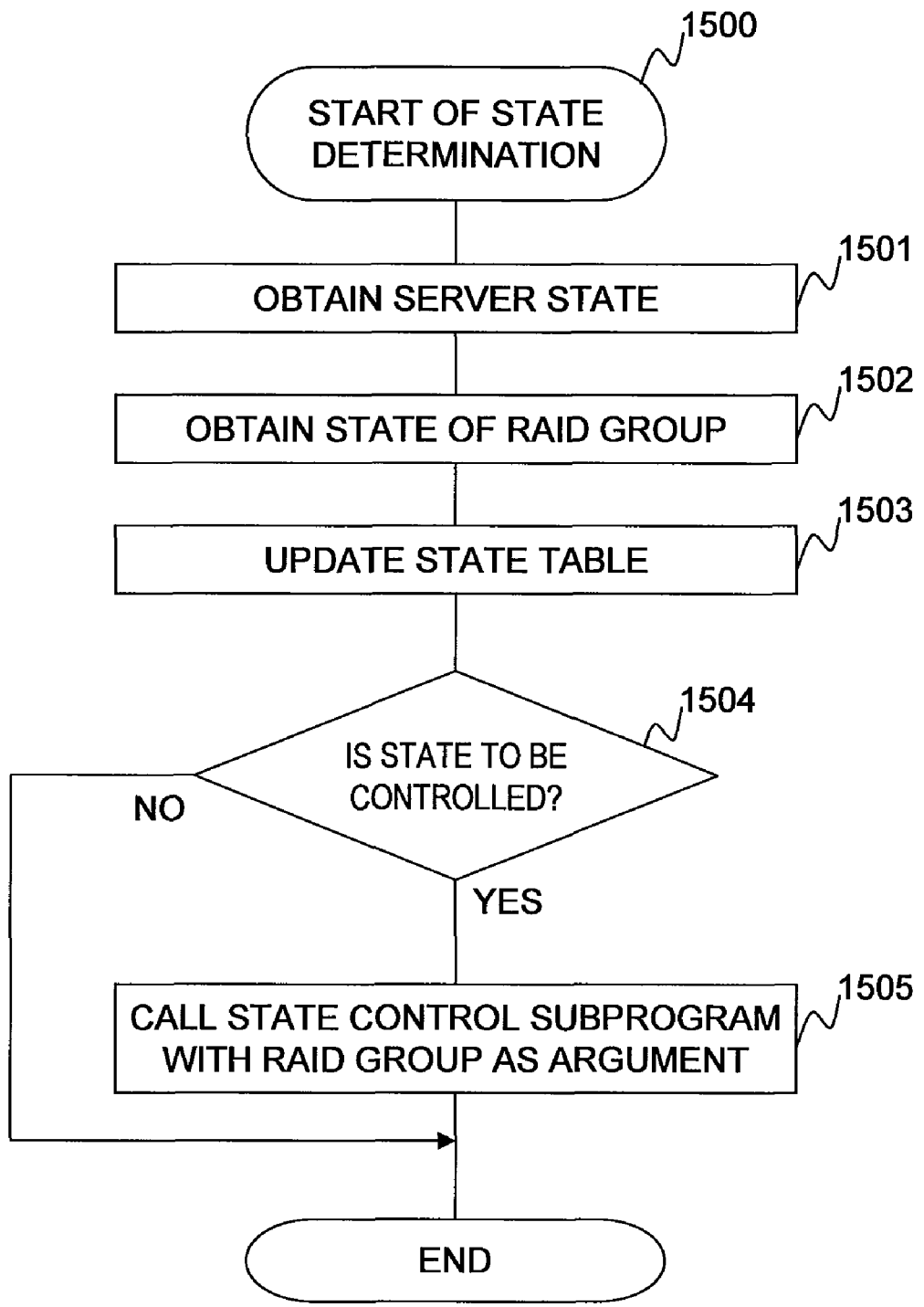
FIG. 15 is a flowchart showing a process executed by a state determination subprogram in accordance with the first embodiment of this invention.

FIG. 15 is a flowchart showing a process executed by the state determination subprogram 604 accordance to the first embodiment of this invention.

In a step 1501, the state determination subprogram 604 refers to the server management table 610 based on an identifier of a server 111 obtained from the relationship search subprogram 603, and obtains the state of the server 111.

Then, in a step 1502, the state determination subprogram 611 refers to the storage management table 611 based on an identifier of the RAID group 430 obtained from the relationship search subprogram 603, and obtains the state of the RAID group 430.

Then, in a step 1503, the state determination subprogram 611 updates contents of the RAID group 430 of the state table 613 based on the state of the server 111 obtained in the step 1501. Specifically, if the state of the server 111 changes from the "OFF" state or the "STANDBY" state to the "ON" state, the use state 1002 of the RAID group 430 is increased by one. On the other hand, if the state of the server 111 changes from the "ON" state to the "OFF" state or the "STANDBY" state, the use state 1002 of the RAID group 430 is decreased by one. It should be noted that if the state of the server 111 changes from the "STANDBY" state to the "OFF" state, a value of the use state 1002 does not change.

For example, if the state of the "SERVER 1" in the server management table 610 shown in FIG. 7 changes from "ON" state to the "OFF" state, from the relationship table 612 shown in FIG. 9, it is observed that the "SERVER 1" uses the RAID group 430 "GROUP 1", and, in the step 1503, the use state of the "GROUP 1" in the state table 613 shown in FIG. 10 changes from "1" to "0" as a result of the decrease by one. It should be noted that the state of the server 111 before the change is retained by the state monitoring subprogram 602 in the memory 201, the auxiliary storage device 207, or the like, and the state determination subprogram 611 can thus obtain the information on the state of the server 111 before the change in the step 1503.

Then, in a step 1504, the state determination subprogram 611 determines whether to control the state of the RAID group 430. Specifically, the state determination subprogram 611 refers to the state of the RAID group 430 obtained in the step 1502 and the use state of the RAID group 430 in the state table 613 updated in the step 1503, if the state of the RAID group 430 is "ACTIVE", and a value of the use state 1002 of the RAID group 430 is "0", the state determination subprogram 611 determines to set the state of the RAID group 430 to the "POWER SAVING" state, and proceeds to a step 1505. On the other hand, if the RAID group 430 is not in the "POWER SAVING" state, and/or the value of the use state 1002 of the RAID group 430 is not "0", the state determination subprogram 611 determines to reset the power saving of the RAID group 430, and proceeds to the step 1505. If the RAID group 430 is in the other states, the state determination subprogram 611 finishes the process.

On this occasion, the power saving specifically implies that the RAID group 430 is controlled in a power saving state. It should be noted that the power saving includes two modes: one mode provides control so that disks can be used immediately, and the other mode provides control so that a delay occurs until the disks become operable.

Then, in the step 1505, the state determination subprogram 611 calls the state control subprogram 605 with values of the identifier, the state, and the use state of the RAID group 430 as arguments.

Figure 16:
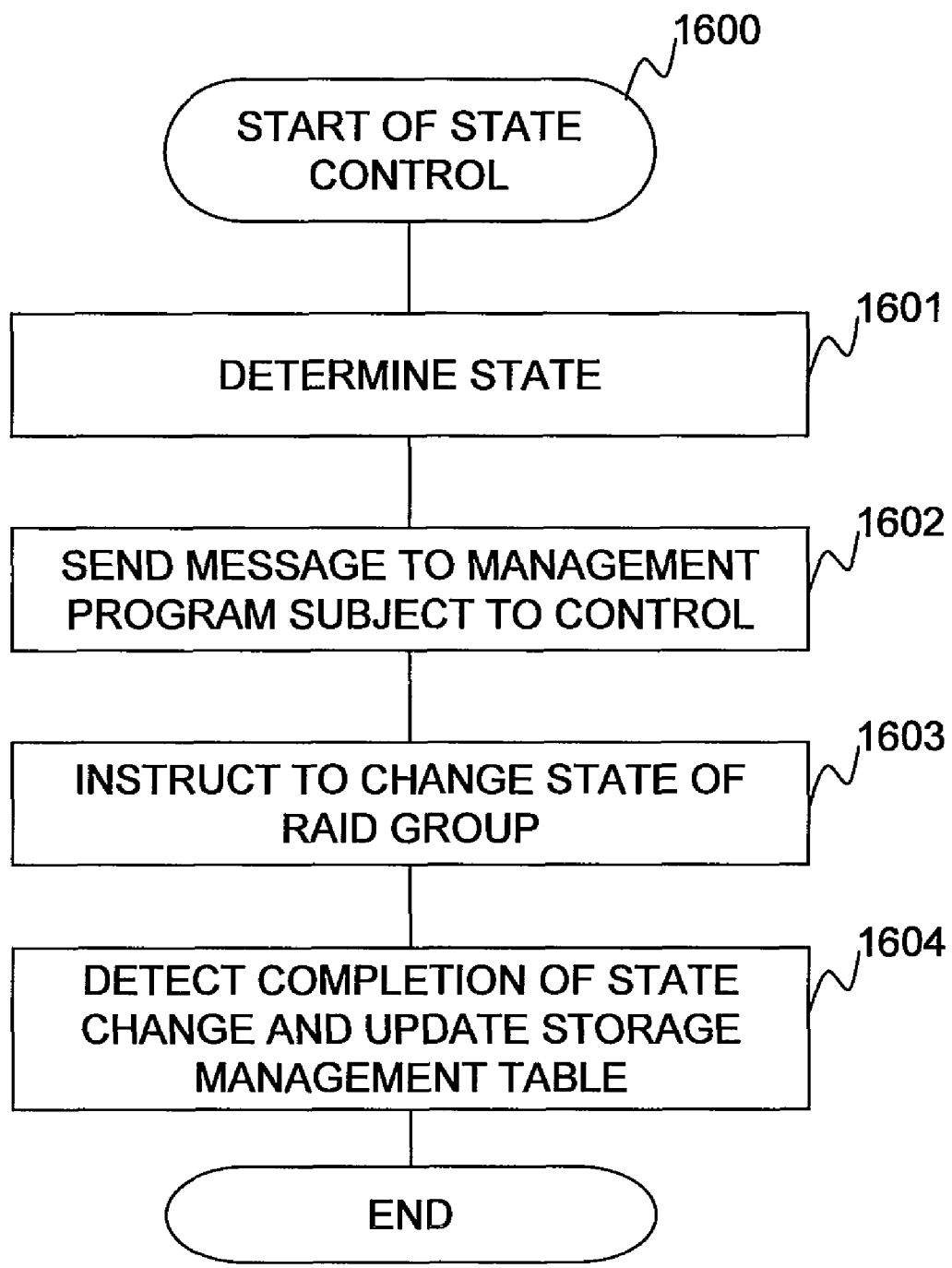
FIG. 16 is a flowchart showing a process executed by a state control subprogram in accordance with the first embodiment of this invention.

FIG. 16 is a flowchart showing a process executed by the state control subprogram 605 according to the first embodiment of this invention.

In a step 1601, the state control subprogram 605 determines the electric power consumption state of a RAID group 430 based on the identifier of the RAID group 430, the state of the RAID group 430, and the use state of the RAID group 430 obtained from the state determination subprogram 604. Specifically, if the state of the RAID group 430 is "ACTIVE", and a value of the use state of the RAID group 430 is "0", the state control subprogram 605 determines to set the RAID group 430 to the "POWER SAVING" state. On the other hand, if the RAID group 430 is in the "POWER SAVING" state, and a value of the use state of the RAID group 430 is not "0", the state control subprogram 605 determines to set the RAID group 430 to the "ACTIVE" state.

Then, in a step 1602, the state control subprogram 605 transmits a message notifying that the state of the RAID group 430 is to be changed to a management program managing the external storage system 104 including the RAID group 430.

Then, in a step 1603, the state control subprogram 605 issues an instruction to change the state of the RAID group 430 to the state determined in the step 1601. Specifically, the state control subprogram 605 instructs the controller 140 of the external storage system 104 to change the state. Then, based on the provided instruction, the controller 140 of the external storage system 104 changes the electric power consumption state of the RAID group 430 by changing the operation mode of the physical disks 141 included in the RAID group 430.

Then, in a step 1604, the state control subprogram 605 detects the completion of the instruction in the step 1603, and changes the state of the RAID group 430 in the storage management table 611 to the state determined in the step 1601.

It should be noted that the above first embodiment is described assuming that the servers and the RAID groups of the external storage system are data processing devices which control the electric power consumption of the computer system for embodying the first embodiment of this invention. The data processing devices subject to the control for the electric power consumption may include other devices such as the network switch, the fiber channel switch, and the load balancer.

For example, the network switch may be the data processing device subject to the control for the electric power consumption while physically a port unit, logically a VLAN unit, or a set thereof is considered as a unit of the control. Moreover, the power supply of the network switch can be controlled according to a state of the power supply of the servers. For example, if all the servers connected to the network switch are turned off, the power supply of the network switch may be controlled (for example, the power supply is controlled in a power saving state).

Second Embodiment

A second embodiment of this invention is an example in which the electric power control program 110 changes the use state of the RAID group 430 based on types of the state change of the server 111 according to a predetermined policy.

Figure 17:
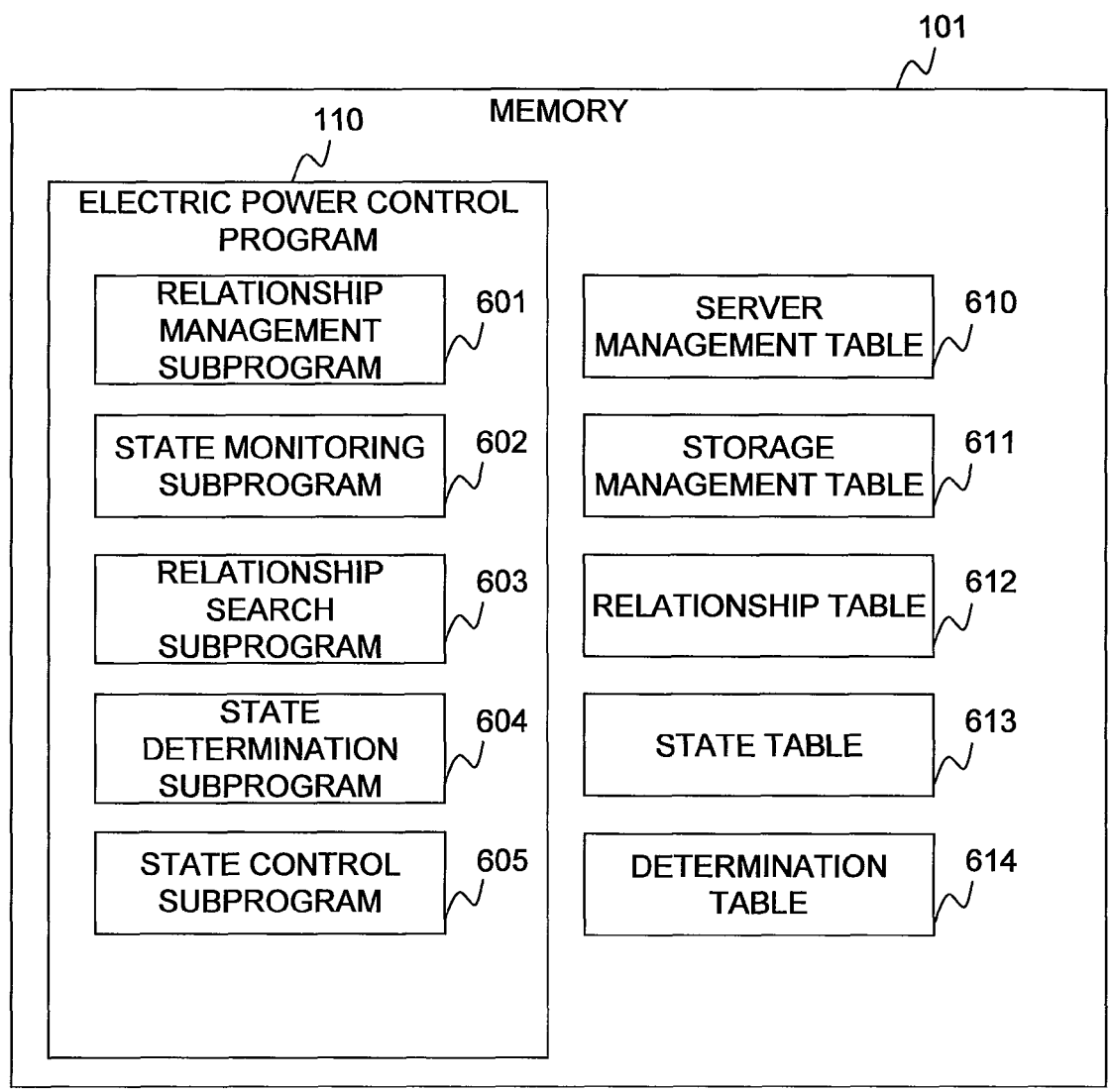
FIG. 17 is a block diagram showing a configuration of a memory of a management server in accordance with a second embodiment of this invention.

FIG. 17 is a block diagram of a configuration of the memory 301 of the management server 101 according to the second embodiment of this invention.

The second embodiment is different from the first embodiment in that the memory 301 of the management server 101 stores a determination table 614. The determination table 614 retains information of an update policy for updating the use state of the relationship table 612 referred by the relationship management subprogram 601 and the state determination subprogram 604.

FIG. 18 describes the determination table 614 according to the second embodiment of this invention.

The determination table 614 includes state change types 1801 and use state update policies 1802.

The state change type 1801 is a type of the state of a server 111. The use state update policy 1802 is a policy to update a value of the use state in the state table 613 of a RAID group 430 relating to the server 111 according to the state change of the server 111 described in the state change type 1801.

Specifically, if the state of the server 111 changes from a state in which the use state update policy 1802 is "+1" to a state in which the use state update policy 1802 is "−1", a value of the use state 1002 in the state table 613 decreases by one. If the state of the server 111 changes from a state in which the use state update policy 1802 is "+1" to a state in which the use state update policy 1802 is "+1", a value of the use state 1002 in the state table 613 remains the same. If the state of the server 111 changes from a state in which the use state update policy 1802 is "−1" to a state in which the use state update policy 1802 is "+1", a value of the use state 1001 in the state table 613 increases by one. If the state of the server 111 changes from a state in which the use state update policy 1802 is "−1" to a state in which the use state update policy 1802 is "−1", the value of the use state 1002 in the state table 613 remains the same.

According to the second embodiment of this invention, when a server 111 is using a RAID group 430, this state corresponds to a state change type 1801 for which the use state update policy 1802 is "+1" in the determination table 614. Moreover, when a server 111 is not using a RAID group 430, this state corresponds to a state change type 1801 for which the use state update policy 1802 is "−1" in the determination table 614. In the step 1105 of the relationship management subprogram 601 shown in FIG. 11 according to the first embodiment of this invention, the state of the server 111 using the RAID group 430 follows the above definition. Moreover, in the step 1503 of the state determination subprogram 604 shown in FIG. 15 according to the first embodiment of this invention, the state of the server 111 using the RAID group 430, and the state of the server 111 not using the RAID group 430 follow the above definition.

It should be noted that the determination table 614 is set by an input by the administrator. The administrator may set the determination table 614 by inputs via a GUI provided by the electric power control program 110. Moreover, the administrator may set the determination table 614 by input from a command line provided by the electric power control program 110. Further, the setting of the determination table 614 may be obtained from a file stored in a storage device connected to the management server 101, or obtained via a network.

Third Embodiment

A third embodiment of this invention is an example in which the electric power consumption state of a RAID group 430 is changed in response to a state change of a server 111 according to predetermined policies.

FIG. 19 describes the server management table 610 according to the third embodiment of this invention.

The server management table 610 according to the third embodiment is different from that of the first embodiment in that electric power consumption state change policies 704 are added.

The electric power consumption state change policy 704 describes a policy for the change of the electric power consumption state of a RAID group 430 used by a server 111 identified by a server identifier 701.

Specifically, in the step 1601 of the process executed by the state control subprogram 605 shown in FIG. 16, if the state of the RAID group 430 is "ACTIVE", and a value of the use state of the RAID group 430 is "0", the electric power consumption state of the RAID group 430 is determined by a state indicated by the electric power consumption state change policy 704.

Specifically, if the state of the RAID group 430 is "POWER SAVING", and the value of the use state of the RAID group 430 is not "0" in the step 1601, the state control subprogram 605 determines to set the electric power consumption state of the RAID group 430 to the "ACTIVE" state.

The information of the identifier of the server 111 required for referring to the server management table 610 is obtained by the state monitoring subprogram 602 when the state of the server 111 changes, the obtained identifier of the server 111 is retained in the memory 201, the auxiliary storage device 207, or the like, and is used as an argument for calling the state control subprogram 605. For example, in FIG. 19, when the state of the server 1 is changed from on to off, the state of the RAID group 430 relating to the server 111 enters the "POWER SAVING STATE 1". It should be noted that the technology for controlling the electric power consumption of a RAID group 430 supported by the external storage system 104 determines levels of the power saving state of the electric power consumption state change policy 704 (such as "POWER SAVING STATE 1", "POWER SAVING STATE 2", and "POWER SAVING STATE 3").

Specifically, if a server 111 has a long period between on and off of the power supply, the frequency of switching the power supply is thus low, and the server 111 is set to a power saving state at a deep level, and if a serve 111 has a short period between on and off of the power supply, the frequency of switching the power supply is thus high, and the server 111 is set to a power saving state at a shallow level. By setting the level of the power saving state according to the state of server, it is possible to increase efficiency of the power saving without affecting the operation of the computer system.

Moreover, a period until a RAID group 430 starts operating depends on the depth of the level of the power saving state. For example, a RAID group 430 with a deep power saving state requires a long period until the start of the operation, and a RAID group 430 with a shallow power saving state requires a short period until the star of the operation.

It should be noted that the electric power consumption state change policy 704 is set by an input by the administrator. The administrator may set the electric power consumption state change policy 704 by inputs via a GUI provided by the electric power control program 110. Moreover, the administrator may set the electric power consumption state change policy 704 by input from a command line provided by the electric power control program 110. Further, the electric power consumption state change policy 704 may be obtained from a file stored in a storage device connected to the management server 101, or obtained via a network.

Moreover, the electric power consumption state control module 403 of the external storage system 104 shown in FIG. 4 according to the first embodiment of this invention may include an interface for reporting the levels of the electric power consumption state of a RAID group 430 supported by the external storage system 104 to the electric power control program 110 connected via the NIC 402. In this case, the electric power control program 110 obtains the levels of the electric power consumption state via the interface, and shows the levels to the administrator via a GUI or texts.

Fourth Embodiment

A fourth embodiment of this invention is an example in which when the state of a server 111 changes, a request for changing the state of the server 111 is restrained until a RAID group 430 relating to the server 111 becomes operable, and the state of the serve 111 changes after the RAID group 430 is operable.

Figure 20:
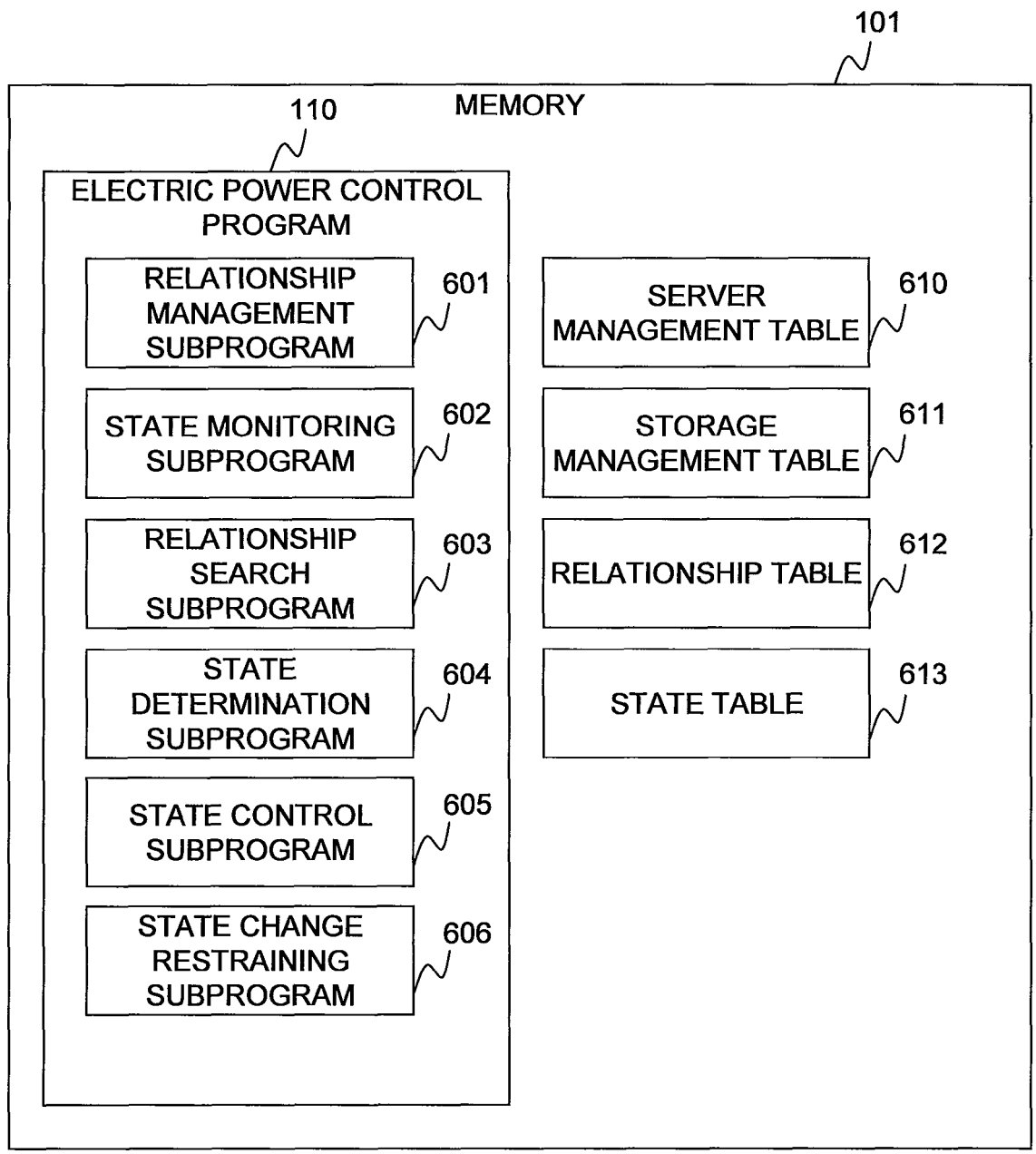
FIG. 20 is a block diagram showing a configuration of a memory of a management server in accordance with a fourth embodiment of this invention.

FIG. 20 is a block diagram of a configuration of the memory 301 of the management server 101 according to the fourth embodiment of this invention.

The electric power control program 110 according to the fourth embodiment is different from the first embodiment in that the electric power control program 110 includes a state change restraining subprogram 606 which restrains a server 111 from being turned on.

Figure 21:
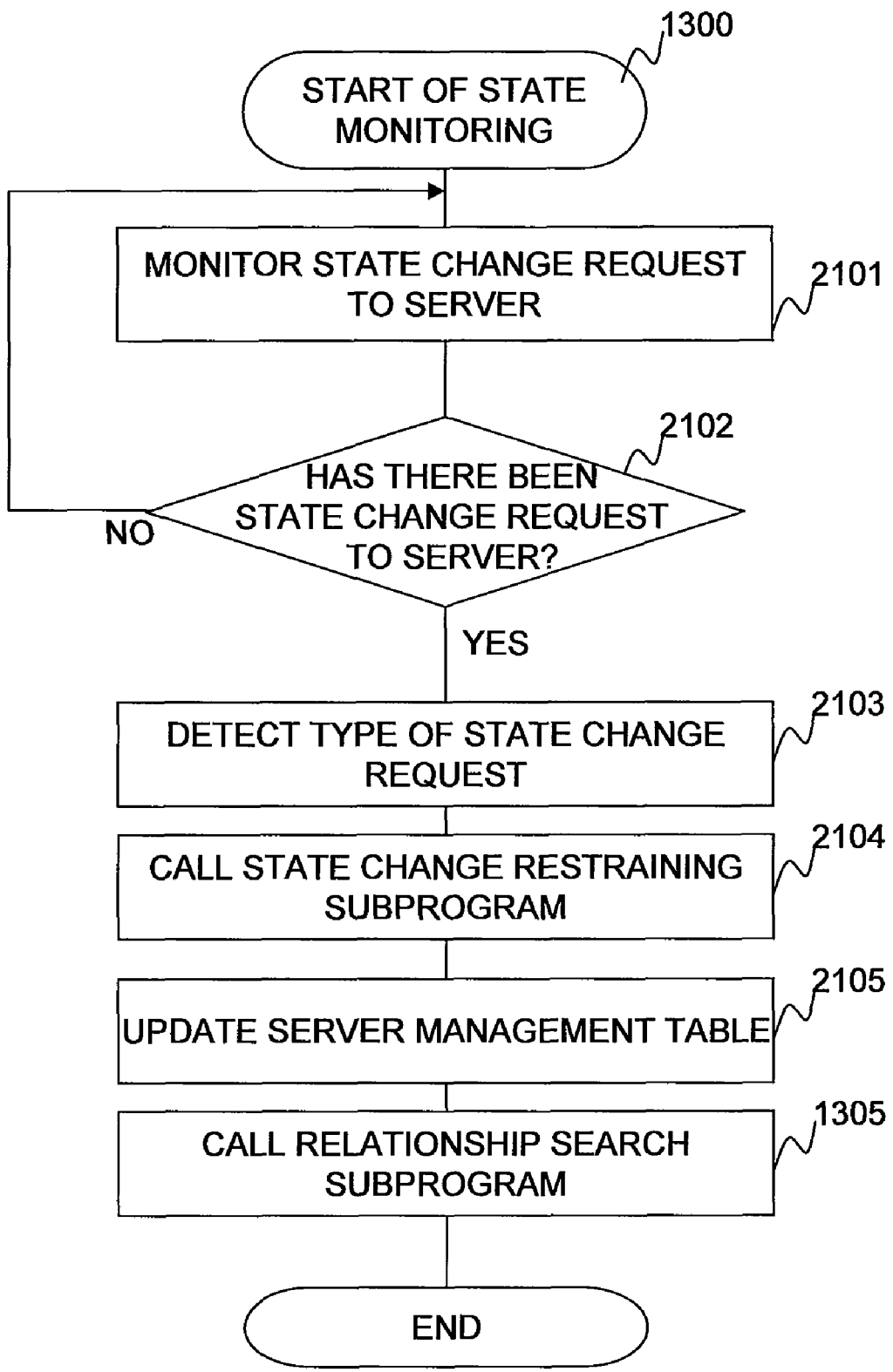
FIG. 21 is a flowchart showing a process executed by a state monitoring subprogram in accordance with the fourth embodiment of this invention.

FIG. 21 is a flowchart showing a process executed by the state monitoring subprogram 602 according to the fourth embodiment of this invention.

The state monitoring subprogram 602 according to the fourth embodiment is different from that according to the first embodiment in steps 2101, 2102, 2103, 2104, and 2105. The processing by the other steps are the same as those of the first embodiment, the same processes are designated by identical reference numerals, and hence description thereof is omitted.

In the step 2101, the state monitoring subprogram 602 monitors a request for a change of the state of a server 111. For example, when the administrator requests for turning on the server 111, the state monitoring subprogram 602 detects the request for tuning on before the start of a process to turn on the server 111.

Then, in the step 2102, the state monitoring subprogram 602 determines whether there has been a request for changing the state of the server111 in the step 2101, and, if there has been a request for changing the state, the state monitoring subprogram 602 proceeds to the step 2103. On the other hand, if there has not been a request for changing the state, the state monitoring subprogram 602 returns to the step 2101, and monitors a request for changing the state of the server 111.

In the step 2103, the state monitoring subprogram 602 identifies a type of the request for the state change detected in the step 2101. For example, the state monitoring subprogram 602 identifies whether the request is to change the state of the server 111 to "ON" or "OFF".

In the step 2104, the state monitoring subprogram 602 calls the state change restraining subprogram 606 with the identifier of the server 111 subject to the request for the state change in the step 2101, and the type of the request for the state change detected in the step 2103 as arguments.

Then, in the step 2105, the state monitoring subprogram 602 assumes that the state of the server 111 has changed, and updates the state 702 of the server management table 610.

Figure 22:
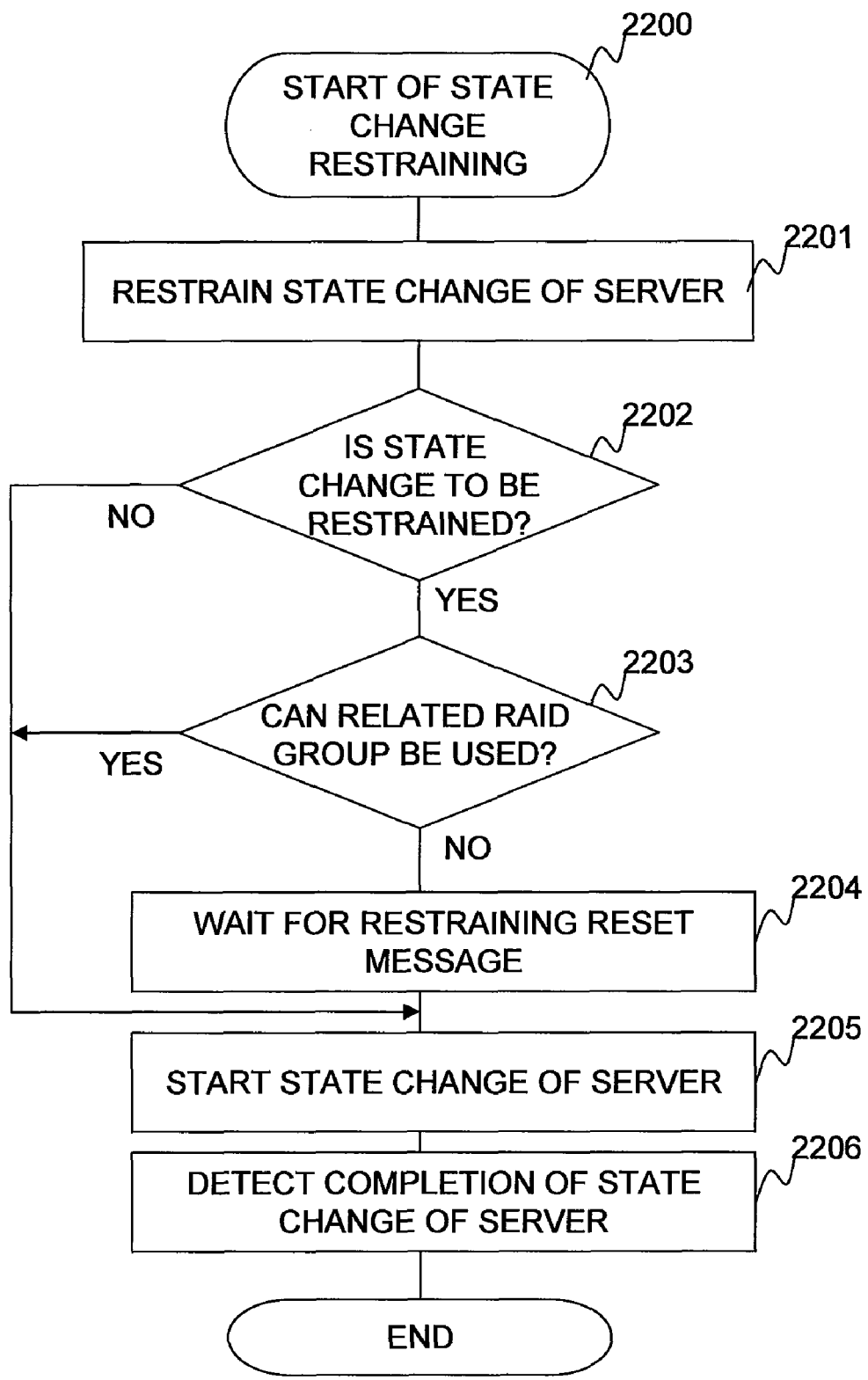
FIG. 22 is a flowchart showing a process executed by a state change restraining subprogram in accordance with the fourth embodiment of this invention.

FIG. 22 is a flowchart showing a process executed by the state change restraining subprogram 606 according to the fourth embodiment of this invention.

In a step 2201, the state change restraining subprogram 606 temporarily stops the start of the state change of a server 111, and sets the server 111 to a wait state.

In a step 2202, the state change restraining subprogram 606 determines whether the state change is to be stopped or not based on the type of the request for the state change of the server 111 obtained as the argument. If the state change restraining subprogram 606 stops the state change, the state change restraining subprogram 606 proceeds to a step 2203. On the other hand, if the state change restraining subprogram 606 does not stop the state change, the state change restraining subprogram 606 proceeds to a step 2205. State changes to be stopped are preferably determined in advance.

Specifically, if the request for the state change is a request for changing from a state in which a RAID group 430 relating to the server 111 is not used to a state in which the RAID group 430 is used, the state change is to be stopped. For example, if the state of the server 111 changes from "OFF" to "ON", the state change is stopped. The definitions of the state in which a server 111 is using a RAID group 430 relating to the server 111, and the state in which a server 111 is not using a RAID group 430 may follow definitions based on the values in the determination table 614 according to the second embodiment of this invention.

In the step 2203, the state change restraining subprogram 606 refers to the relationship table 612 based on the identifier of the server 111 obtained as the argument, and identifies a RAID group 430 relating to the server 111. Then, the state change restraining subprogram 606 refers to the storage management table 611 to obtain the state of the identified RAID group 430.

If the obtained state of the RAID group 430 is a state in which the server 111 cannot use the RAID group 430, the state change restraining subprogram 606 proceeds to a step 2204. On the other hand, if the obtained state of the RAID group 430 is a state in which the server 111 can use the RAID group 430, the state change restraining subprogram 606 proceeds to a step 2205. The state in which the server 111 cannot use the RAID group 430 is a state in which the server 111 cannot access a logical disk 410 included in this RAID group 430, for example.

Then, in the step 2204, the state change restraining subprogram 606 stops in a wait state until the restraining subprogram 606 receives a restraining reset massage. Then, when the state change restraining subprogram 606 receives the restraining reset message, the state change restraining subprogram 606 determines that the server 111 becomes able to use the external storage system 104, proceeds to the step 2205, and starts the state change of the server 111 (step 2205). Then, in a step 2206, the state change restraining subprogram 606 waits until the completion of the state change of the server 111, and when the state change restraining subprogram 606 detects the completion of the state change, the state change restraining subprogram 606 finishes the state change restraining process.

Figure 23:
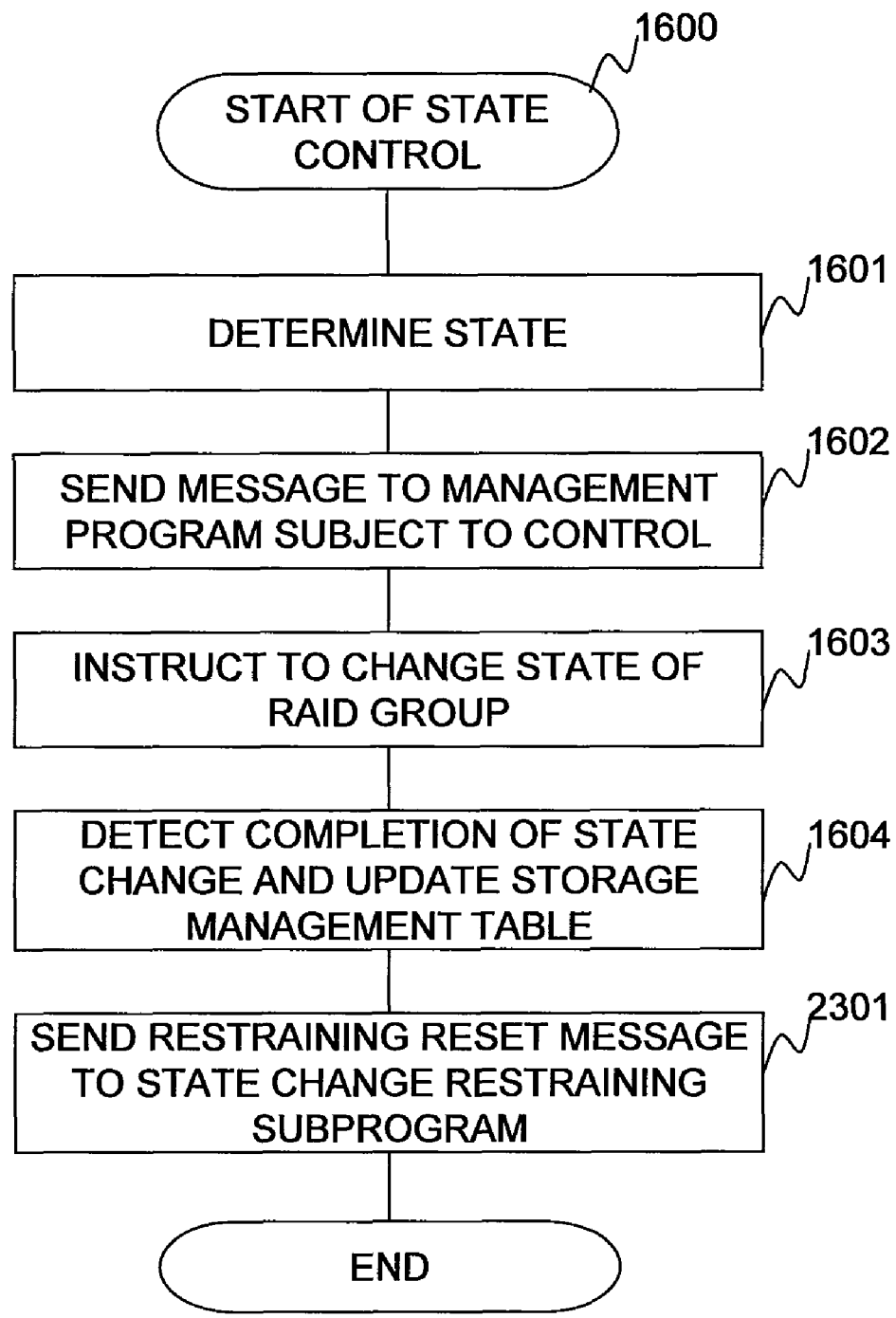
FIG. 23 is a flowchart showing a process executed by a state control subprogram in accordance with the fourth embodiment of this invention.

FIG. 23 is a flowchart showing a process executed by the state control subprogram 605 according to the fourth embodiment of this invention.

The state control subprogram 605 according to the fourth embodiment is different from that of the first embodiment in that a step 2301 is added. After the state control subprogram 605 updates the state of the RAID group 430 in the step 1604, the state control subprogram 605 sends the restraining reset message to the state change restraining subprogram 606 (step 2301).

Fifth Embodiment

A fifth embodiment of this invention is an example in which the electric power consumption state of a RAID group 430 is controlled corresponding to a state change of a server 111 when the server 111 is operated according to a schedule.

Figure 24:
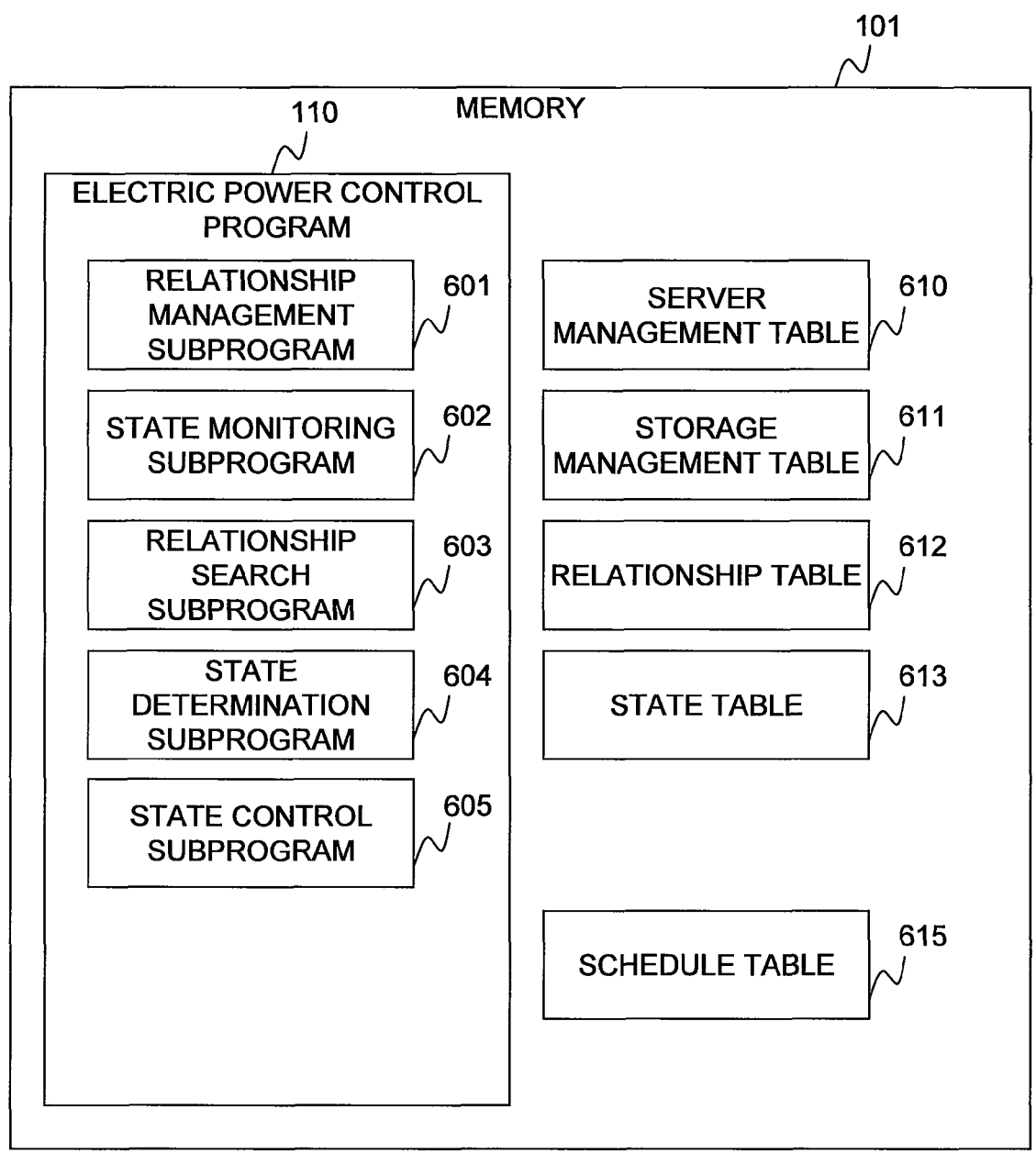
FIG. 24 is a block diagram of a configuration of a memory of a management server in accordance with a fifth embodiment of this invention.

FIG. 24 is a block diagram of a configuration of the memory 301 of the management server 101 according to the fifth embodiment of this invention.

The fifth embodiment is different from the first embodiment in that when the server 111 is operated according to a schedule, a schedule table 615 which retains information required for the scheduled operation is stored in the memory 301.

Figure 25:
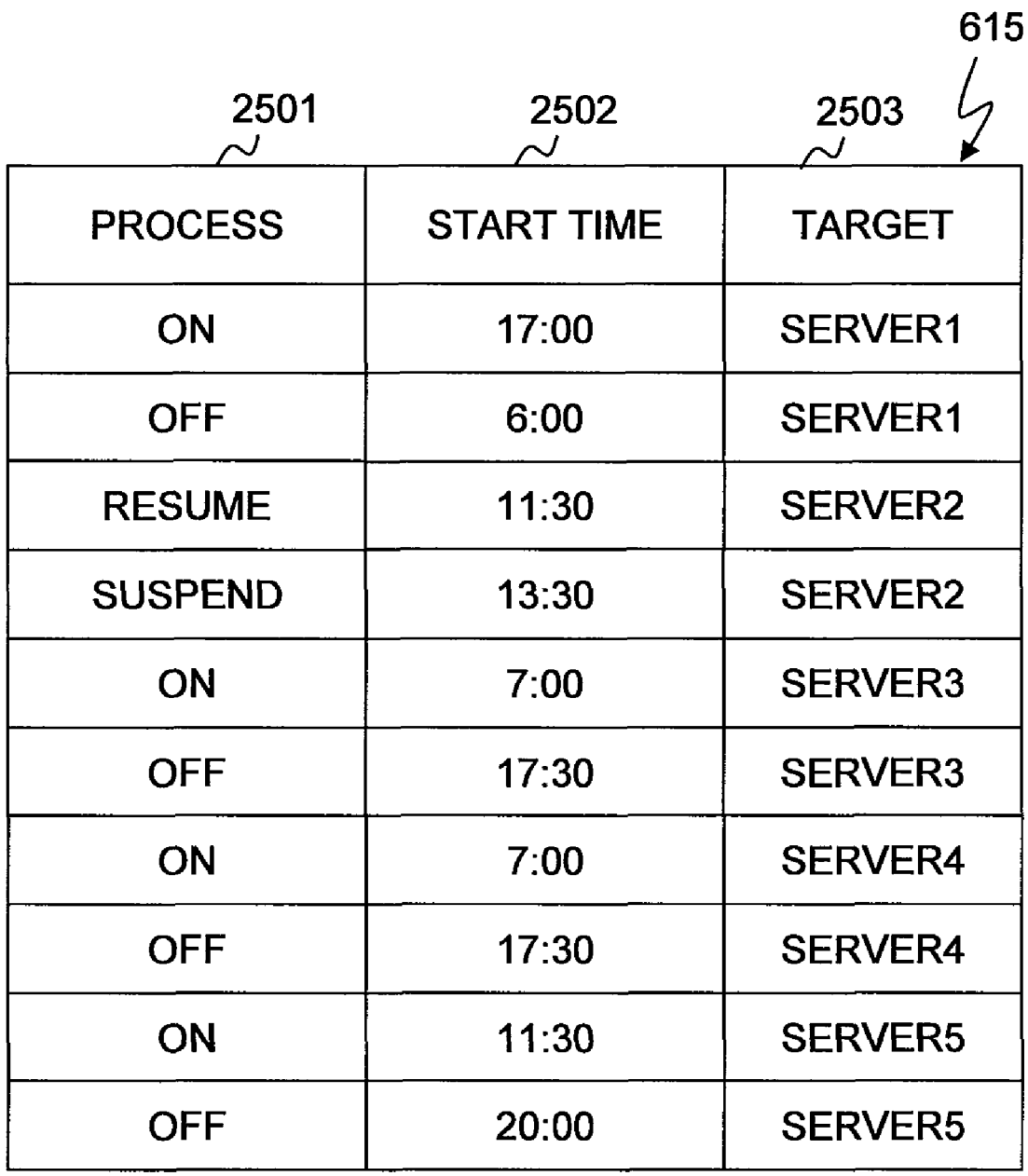
FIG. 25 is an explanatory diagram showing a schedule table in accordance with the fifth embodiment of this invention.

FIG. 25 describes the schedule table 615 according to the fifth embodiment of this invention.

The schedule table 615 includes processes 2501, start times 2502, and targets 2503. The process 2501 is a process to be executed by a server 111 during a scheduled operation. The start time 2502 is a time to start the process 2501. The object 2503 is an identifier of the server 111 which carries out the process 2501.

In an example shown in FIG. 25, a start time 2502 and a target 2503 of a process 2501 of "ON" is "17:00" and "SERVER 1", so a process to turn on the server 1 is started at 5:00 PM everyday. It should be noted that the schedule table 615 is set by an input by the administrator. The administrator may set the schedule table 615 by inputs via a GUI provided by the electric power control program 110. Moreover, the administrator may set the schedule table 615 by input from a command line provided by the electric power control program 110. Further, the schedule table 615 may be obtained from a file stored in a storage device connected to the management server 101, or obtained via a network.

Figure 26:
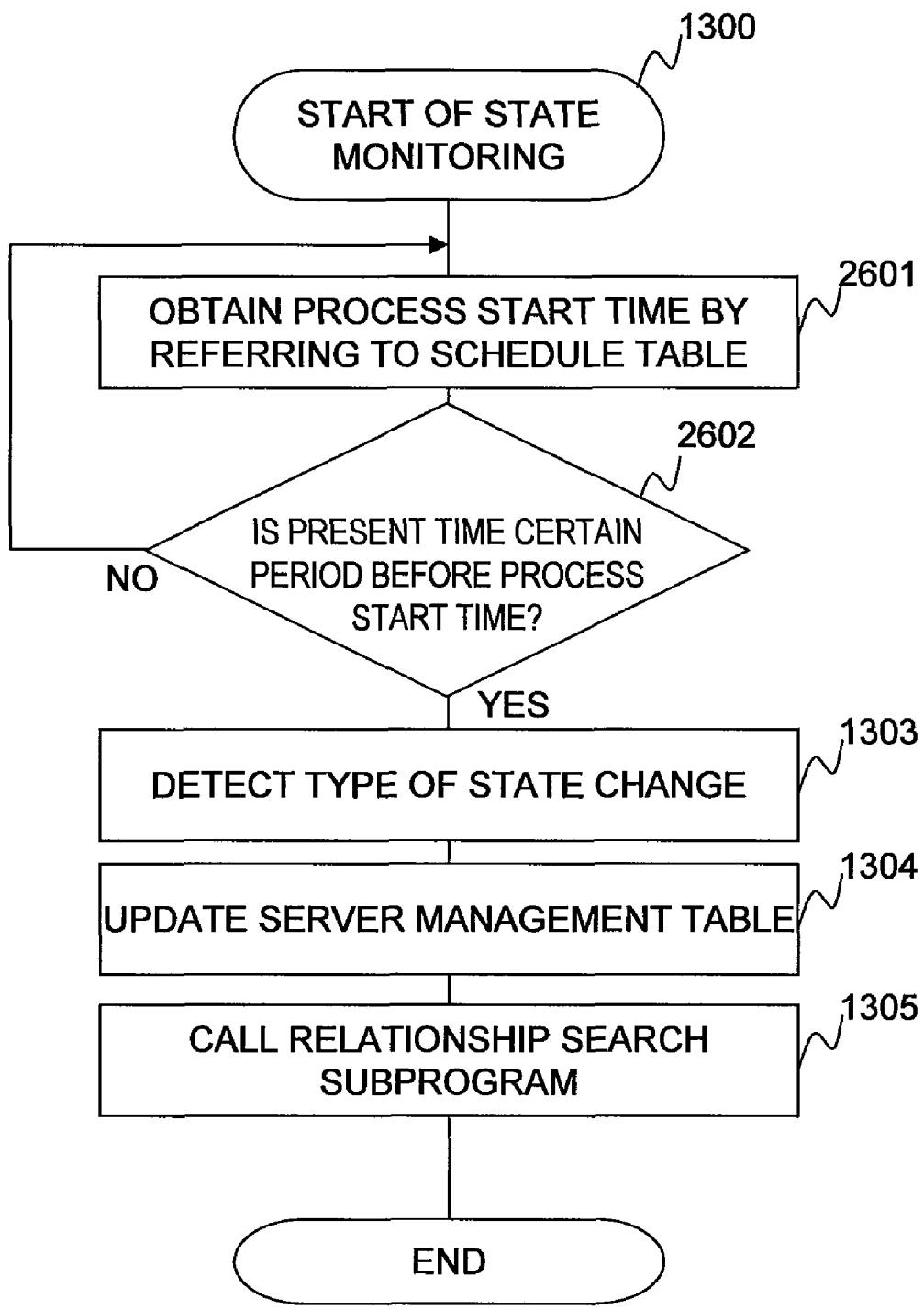
FIG. 26 is a flowchart showing a process executed by a state monitoring subprogram in accordance with the fifth embodiment of this invention.

FIG. 26 is a flowchart showing a process executed by the state monitoring subprogram 602 according to the fifth embodiment of this invention.

The state monitoring subprogram 602 according to the fifth embodiment is different from that of the first embodiment in steps 2601 and 2602. The processes by the other steps are the same as those of the first embodiment, the same processes are designated by identical reference numerals, and hence description thereof is omitted.

In the step 2601, the state monitoring subprogram 602 refers to the schedule table 615, and obtains a start time of a process and an identifier of a server 111 which executes the process.

Then, in a step 2602, the state monitoring subprogram 602 determines whether the present time is a time a certain period or less before the start time of the process obtained in the step 2601, and if the present time is the time the certain period or less before the start time, the state monitoring subprogram 602 issues an instruction to make a RAID group 430 used by the server 111 operable, and proceeds to a step 1303. It should be noted that the controller 140 of the external storage system 104 makes the RAID group 430 operable based on the instruction. Moreover, if the difference between the present time and the start time of the process is longer than the certain period, the state monitoring subprogram 602 returns to the step 2601, and obtains the start time of the process and the identifier of the server 111 which executes this process.

On this occasion, the certain period is a period required for the RAID group 430 changing from the inoperable state to the operable state for the server 111, for example. If the state of the RAID group 430 is at the deep power saving level, the certain period is loner, and if the state of the RAID group 430 is at the shallow power saving level, the certain period is shorter.

Moreover, the certain period may be set by the administrator via a GUI or another interface. Moreover, in place of the steps 2601 and 2602, the schedule table 615 may be set so that a certain process (such as a process for issuing an instruction to make the RAID group 430 used by the server 111 operable) is executed a certain period before the start time of the process described in the schedule table 615, and the step 1303 may be reached as a result of the execution of the set process.

Sixth Embodiment

The sixth embodiment of this invention is an example in which the computer system shows the administrator guide information for controlling the electric power consumption.

Figure 27:
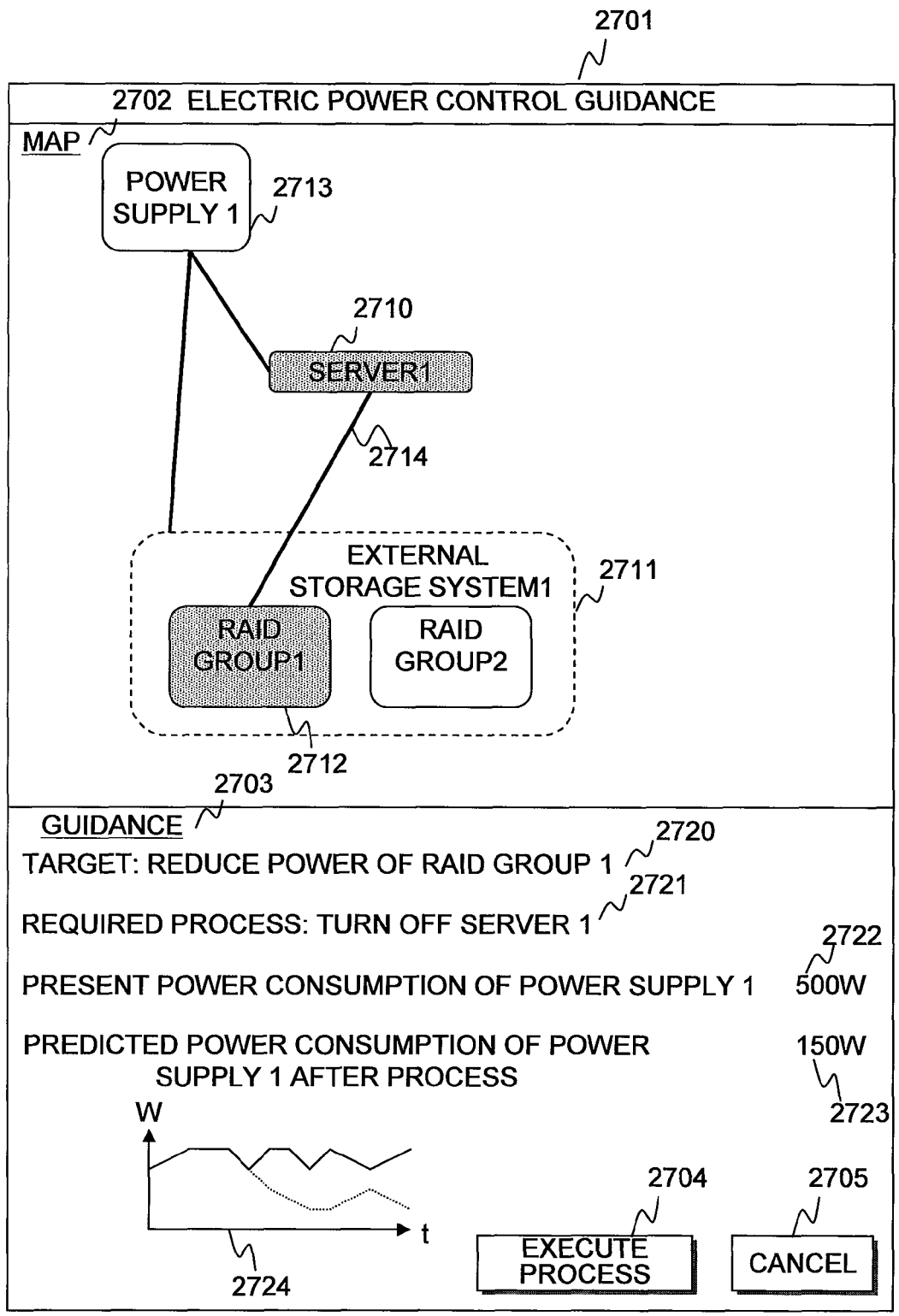
FIG. 27 is an explanatory diagram showing an example of a GUI showing a guidance of an electric power consumption in accordance with a sixth embodiment of this invention.

FIG. 27 describes an example of a GUI provided by the electric power control program 110 according to the sixth embodiment of this invention.

The GUI according to the sixth embodiment carries out a display with a browser or a dedicated program on the display device 306 shown in FIG. 3, or on another display device or the like via a network.

A window 2701 is a window of the browser or the program. Moreover, the window 2701 includes a map 2702 for showing the data processing devices included in the computer system as the units of the control of the electric power consumption state, and a portion showing a guidance 2703 of the electric power consumption. The map 2702 also shows additional information of the data processing devices.

For example, the map 2702 in FIG. 27 shows a server 1 (2710), an external storage system 1 (2711), RAID groups 1 and 2 of the external storage system 1 (2712), a power supply 1 (2713), and relationship lines 2714. Moreover, the relationship between the RAID group 1 (2712) and the server 1 (2710) is identified by a color.

Moreover, the guidance 2703 shows that if "REDUCE POWER OF RAID GROUP 1" is set to a target 2720, a solution for the target is shown to a required process 2721 by executing "TURN OFF SERVER 1". Moreover, the guidance also shows the present electric power consumption 2722, and a predicted electric power consumption 2723 after the required process 2721 is executed for the entire computer system or a certain power supply device.

Moreover, the guidance 2703 also shows information on the power saving of the power supply 1 (2713). Further, the guidance 2703 shows a chart 2724 of the electric power consumption of the entire computer system or the power supply device against the time, a solid line shows the present electric power consumption, and a broken line shows the predicted electric power consumption after the required process 2721. It should be noted that the entire information described above is not necessarily shown, and information necessary for the administrator may be selectively shown. Moreover, when the electric power consumption is shown, there is provided a configuration that the data processing devices, the power supply device, or the like has a function to measure the electric power consumption, and the electric power control program 110 obtains the measured electric power consumption.

The administrator operates a process execution button 2704 to execute the required process 2721. On the other hand, the administrator operates a cancel button 2705 to cancel the required process 2721.

Seventh Embodiment

A seventh embodiment of this invention is a variation of the above fourth embodiment, and is an example in which the administrator sets a target of the electric power consumption, and the electric power control program 110 restrains processes of data processing devices causing electric power consumption exceeding the target.

Figure 28:
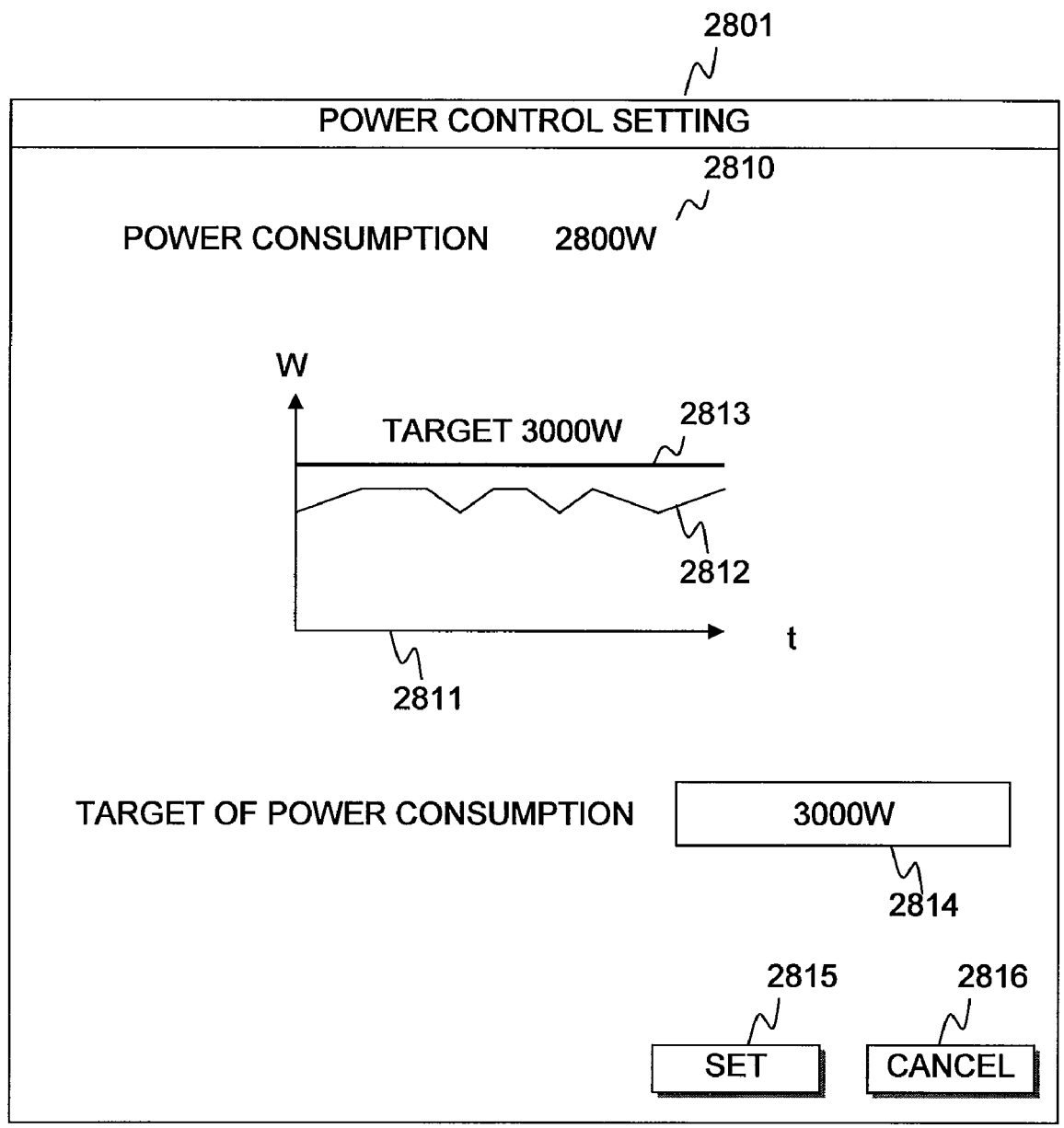
FIG. 28 is an explanatory diagram showing an example of a GUI in order to set an electric power consumption in accordance with a seventh embodiment of this invention.

FIG. 28 describes an example of a GUI provided by the electric power control program 110 according to the seventh embodiment of this invention.

The GUI carries out a display with a browser or a dedicated program on the display device 306 according to the first embodiment of this invention shown in FIG. 3, on another display device or the like via a network.

A window 2801 shows a window of the browser or the program. The window 2801 shows electric power consumption 2810 of the entire computer system, a certain data processing device, the power supply and/or the like, and a chart 2811 of the electric power consumption as a time series.

Moreover, the administrator may input the target 2814 of the electric power consumption on a keyboard or the like, and the input target is shown as a straight line 2813 on the chart 2811. If the administrator wants to set the input target 2814 of the electric power consumption, the administrator operates a set button 2815, and if the administrator wants to cancel the input target 2814 of the electric power consumption, the administrator operates a cancel button 2816.

It should be noted that the target of the electric power consumption may be input from a command line provided by the electric power control program 110 in addition to the GUI. Moreover, the target of the electric power consumption may be obtained from a file stored in a storage device connected to the management server 101, or obtained via a network.

Figure 29:
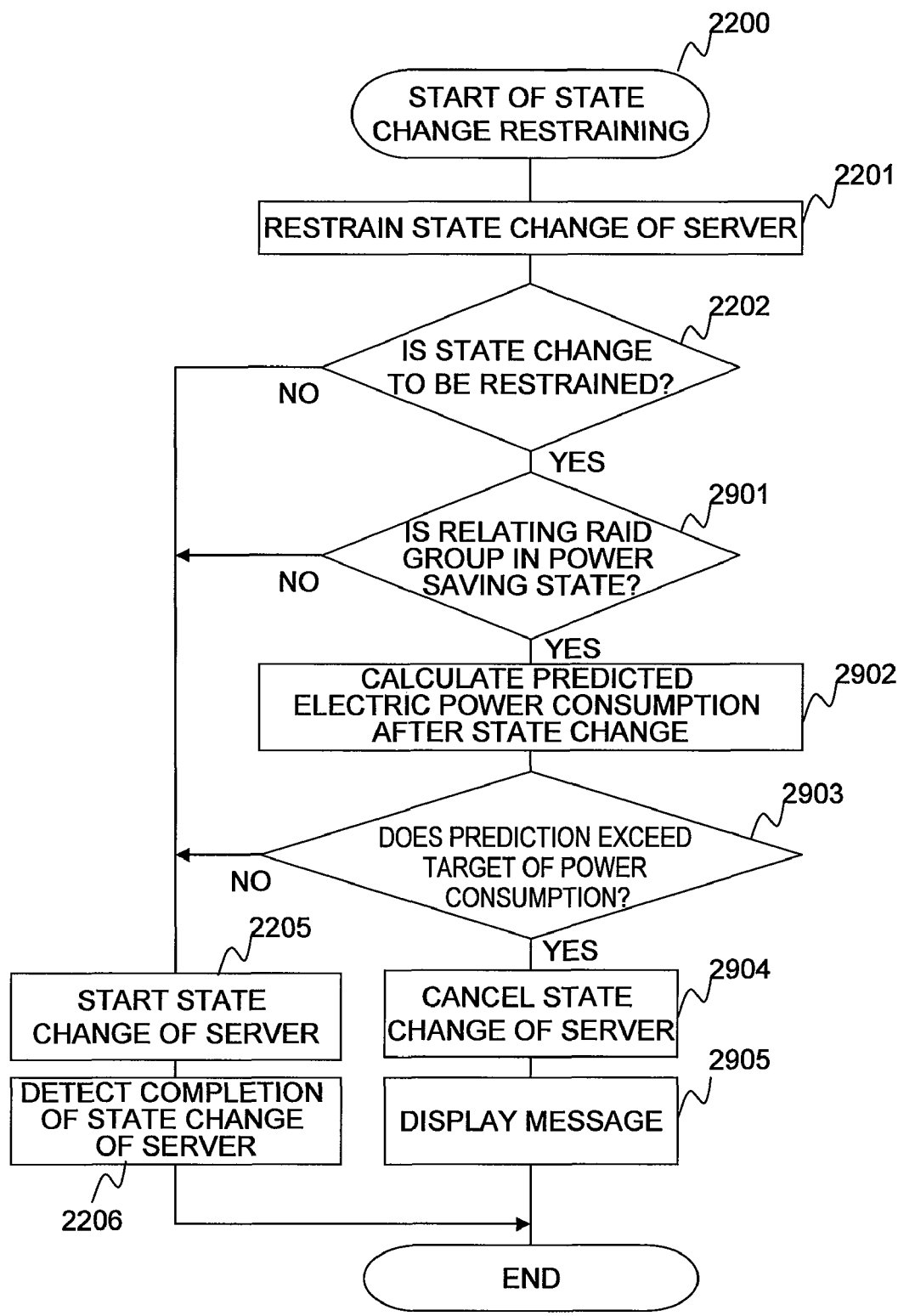
FIG. 29 is a flowchart showing a process executed by a state change restraining subprogram in accordance with the seventh embodiment of this invention.

FIG. 29 is a flowchart showing a process executed by the state change restraining subprogram 602 according to the seventh embodiment of this invention.

The state change restraining subprogram 602 according to the seventh embodiment is different from that according to the fourth embodiment in the steps 2901, 2902, 2903, 2904, and 2905. The processes by the other steps are the same as those of the fourth embodiment, the same processes are designated by identical reference numerals, and hence description thereof is omitted.

In the step 2901, the state change restraining subprogram 602 refers to the relationship table 612 based on the identifier of the server 111 obtained as the argument. Then, the state change restraining subprogram 602 obtains an identifier of a RAID group 430 relating to the server 111, and determines whether this RAID group 430 is operating in the power saving state by referring to the storage management table 611 based on the obtained identifier of the RAID group 430. If the RAID group 430 is in the power saving state, the state change restraining subprogram 602 proceeds to the step 2902. On the other hand, if the RAID group 430 is not in the power saving state, the state change restraining subprogram 602 proceeds to the step 2205.

In the step 2902, the state change restraining subprogram 602 calculates a predicted electric power consumption of data processing devices after the state of the server 111 has changed. On this occasion, the state change restraining subprogram 602 predicts an increase in the electric power consumption of the server 111 based on the state change of the server 111, and calculates an increase in the electric power consumption of the external storage system 104 including a RAID group 430 relating to the sever 111 as a result of the state change of the RAID group 430 from the power saving state.

The increase in the electric power consumption may be calculated based on specifications of the respective data processing devices. The increase in the electric power consumption may be calculated based on electric power consumption characteristics of the respective data processing devices measured by operating a measuring program in advance.

In the step 2903, the state change restraining subprogram 602 determines whether the electric power consumption of the computer system, the data processing apparatus, or the power supply device exceeds the target of the electric power consumption set in advance by the administrator based on the predicted electric power consumption calculated in the step 2902, and if the set electric power consumption exceeds the target electric power consumption, the state change restraining subprogram 602 proceeds to the step 2904. On the other hand, if the set electric power consumption does not exceed the target electric power consumption, the state change restraining subprogram 602 proceeds to the step 2205.

For example, when the administrator sets the target electric power consumption of the external storage system 104 to 3000W (watt), if a server 111 is turned on, it is necessary to change the state of a RAID group 430 relating to the server 111 from the power saving state to the active state, and by changing the state of the RAID group 430, the electric power consumption of the external storage system 104 consequently exceeds the target electric power consumption, the state change restraining subprogram 602 proceeds to the step 2904.

In the step 2904, the state change restraining subprogram 602 cancels the request for the state change restrained in the step 2201.

In the step 2905, the state change restraining subprogram 602 shows a massage notifying the administrator of the cancellation of the request for the state change in the step 2904 through a GUI or as a text. Since the administrator may not cancel the request for the state change, even if the electric power consumption exceeds the target in the step 2903, the state change restraining subprogram 602 may not proceed to the step 2904, and, after notifying the administrator of the message of the electric consumption exceeding the target, may proceed to the step 2205 according to an instruction of the administrator, or may cancel the request for the state change.

It should be noted that the seventh embodiment of this invention does not require the process in the step 2301 by the state control subprogram 605 shown in FIG. 23 according to the fourth embodiment.

Eighth Embodiment

An eighth embodiment of this invention is an example in which the electric power consumption state of a RAID group 430 is controlled in response to a state change of a server 111 when the server 111 is operated according to a schedule.

Figure 30:
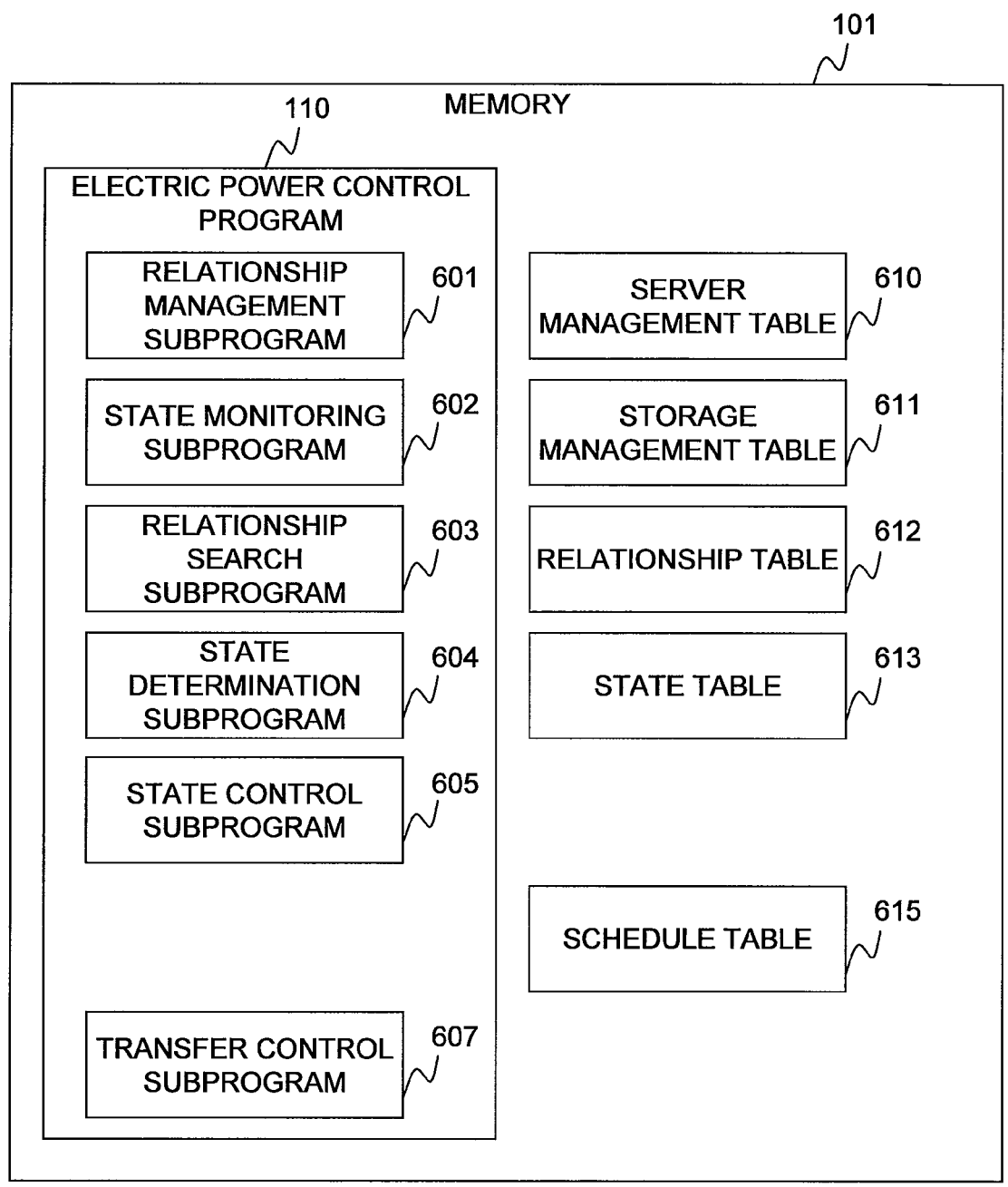
FIG. 30 is a block diagram showing a configuration of a memory of a management server in accordance with an eighth embodiment of this invention.

FIG. 30 is a block diagram of a configuration of the memory 301 of the management server 101 according to the eighth embodiment of this invention.

The electric power control program 110 according to the eighth embodiment is different from that of the first embodiment in that the electric power control program 110 includes a transfer control subprogram 607 which transfers contents of a logical disk 410 of the external storage system 104 between RAID groups 430.

Figure 31:
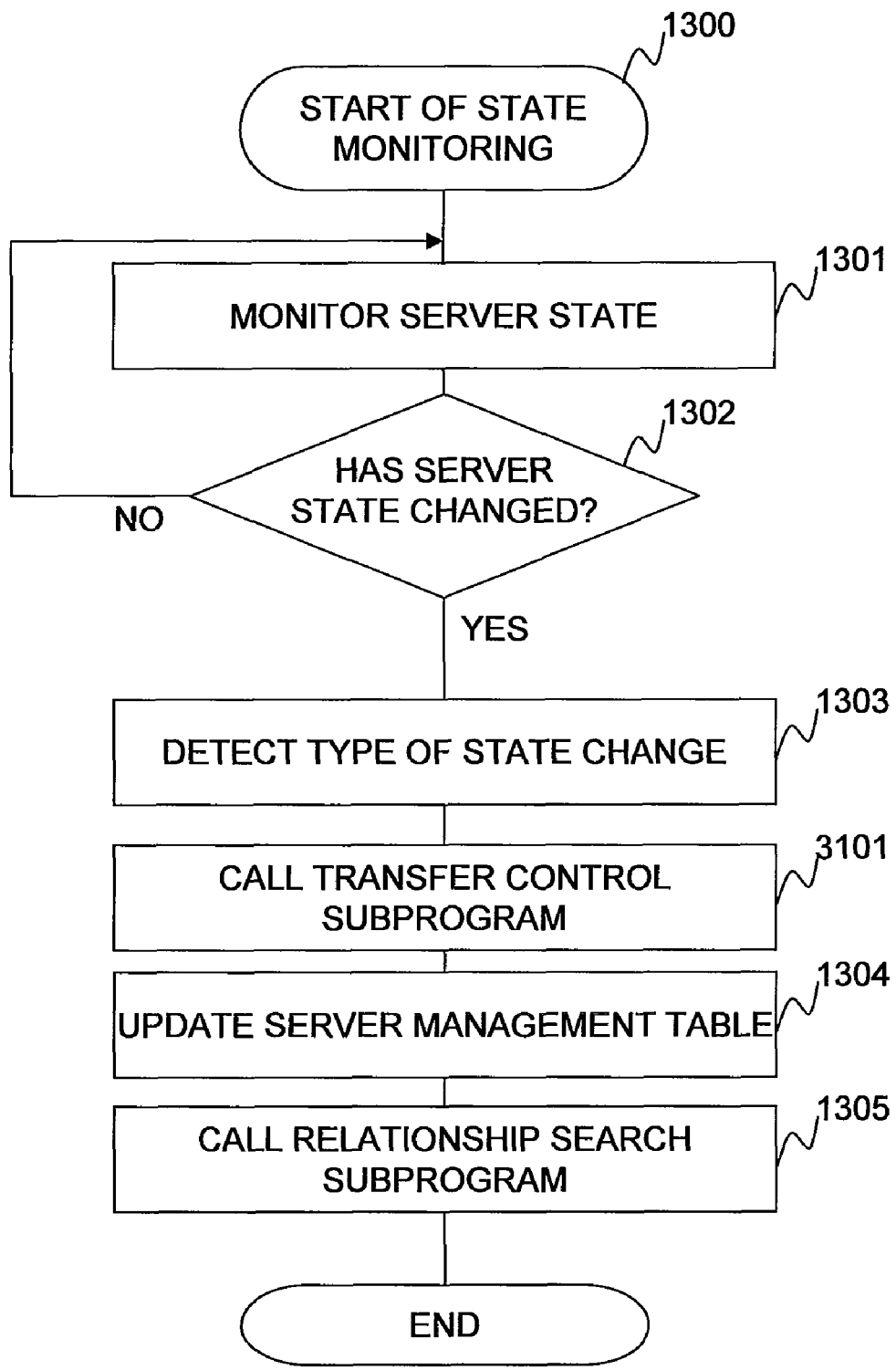
FIG. 31 is a flowchart showing a process executed by a state monitoring subprogram in accordance with the eighth embodiment of this invention.

FIG. 31 is a flowchart showing a process executed by the state monitoring subprogram 602 according to the eighth embodiment of this invention.

The state monitoring subprogram 602 according to the eighth embodiment is different from that of the fifth embodiment in a step 3101. The processes by the other steps are the same as those of the fifth embodiment, the same processes are designated by identical reference numerals, and hence description thereof is omitted.

In the step 3101, the state monitoring subprogram 602 calls the transfer control subprogram 607 with the identifier and the type of the state change of the server 111 the state of which is detected in the step 1301 as arguments.

Figure 32:
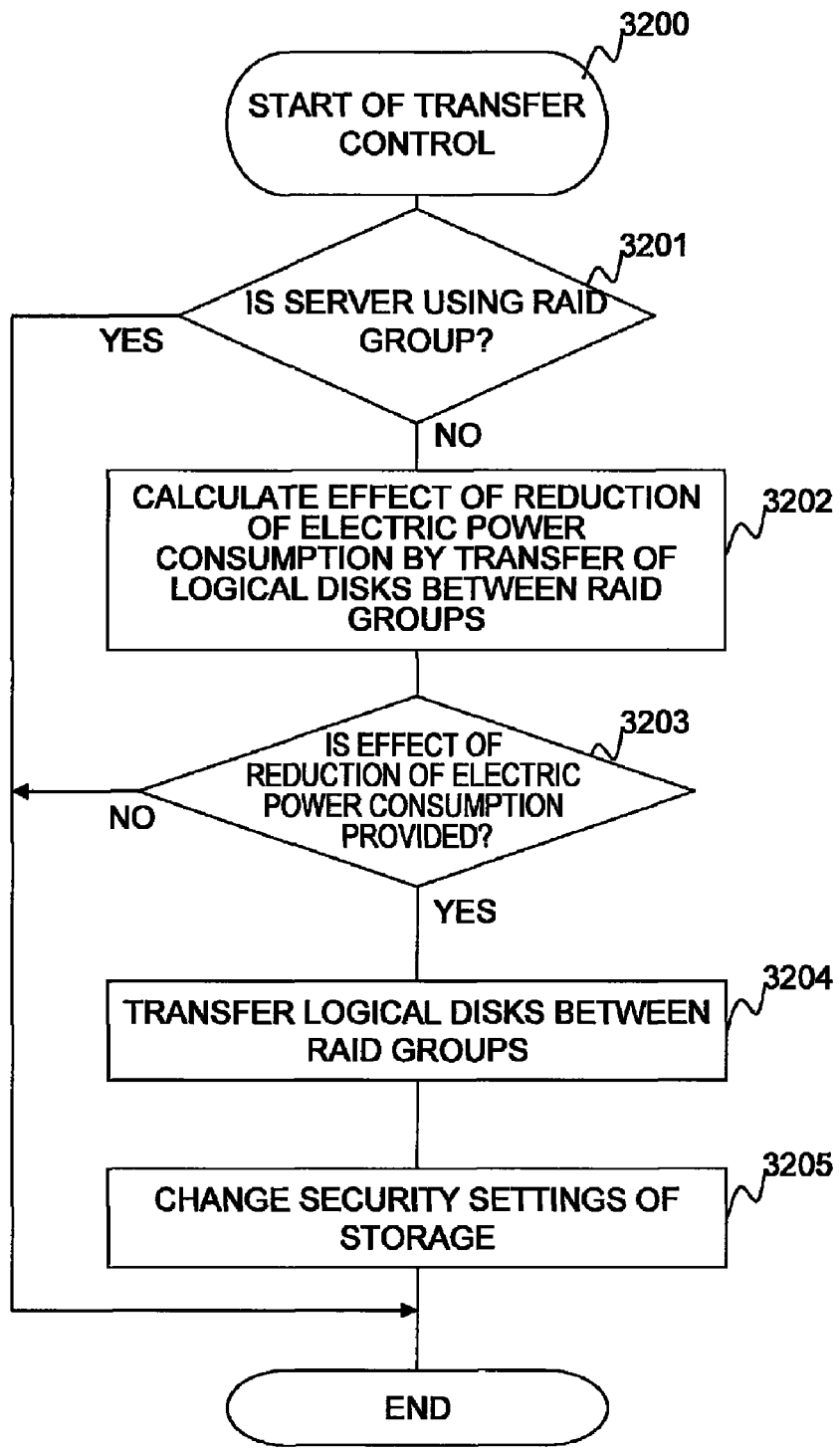
FIG. 32 is a flowchart showing a process executed by a transfer control subprogram in accordance with the eighth embodiment of this invention.

FIG. 32 is a flowchart showing a process executed by the transfer control subprogram 607 according to the eighth embodiment of this invention.

In a step 3201, the transfer control subprogram 607 determines whether the server 111 is in a state of using the RAID group 430. If the transfer control subprogram 607 determines that the server 111 is not in the state of using the RAID group 430, the transfer control subprogram 607 proceeds to a step 3202. On the other hand, if the transfer control subprogram 607 determines that the server 111 is using the RAID group 430, the transfer control subprogram 607 finishes the process.

In the step 3202, the transfer control subprogram 607 calculates an effect of the reduction of the electric power consumption in a case where logical disks 410 used by this server 111 are transferred between RAID groups 430. On this occasion, the transfer control subprogram 607 refers to the schedule table 615, and obtains at least one server 111 which has the longest period in which the server 111 is not using a RAID group 430. For example, in the schedule table 615 shown in FIG. 25, the server 3 and the server 4 has the longest period in which the server is not using a RAID group 430.

Moreover, the transfer control subprogram 607 obtains the RAID groups 430 used by these servers 111 from the relationship table 613, and calculates a change in the electric power consumption in a case where logical disks 410 used by these servers 111 are transferred between the obtained respective RAID groups 430. For example, according to the relationship table 613 in FIG. 9, the server 3 is using the group 2 and the server 4 is using the group 3. Thus, as a result of the calculation, by transferring logical disks 410 used by the server 3 to the group 3 used by the server 4, it is possible to extend the periods in which the RAID groups 430 of the group 2 and the group 3 are operating in the power saving state.

In the step 3203, the transfer control subprogram 607 determines whether an effect to reduce the electric power consumption is provided by comparing the result of the calculation in the step 3202 and the present electric power consumption. This determination may be made by the administrator on a query screen to be shown.

In a step 3204, the transfer control subprogram 607 transfers the logical disks 410 used by the servers 111 between the respective RAID groups 430 calculated in the step 3202.

Then, in a step 3205, the transfer control subprogram 607 changes security setting of the logical disks 410 and the servers 111 if necessary. Specifically, by changing the settings of an access right of the logical disk 410 to be transferred (access right for a port, for example), or changing the setting of a zoning, the security settings of the logical disks 410 and the servers 111 are changed.

Ninth Embodiment

A ninth embodiment of this invention is an example in which, in the computer system according to the first embodiment of this invention, virtual servers are operating, and the process of the electric power control program 110 is also adapted to the virtual servers.

Figure 33:
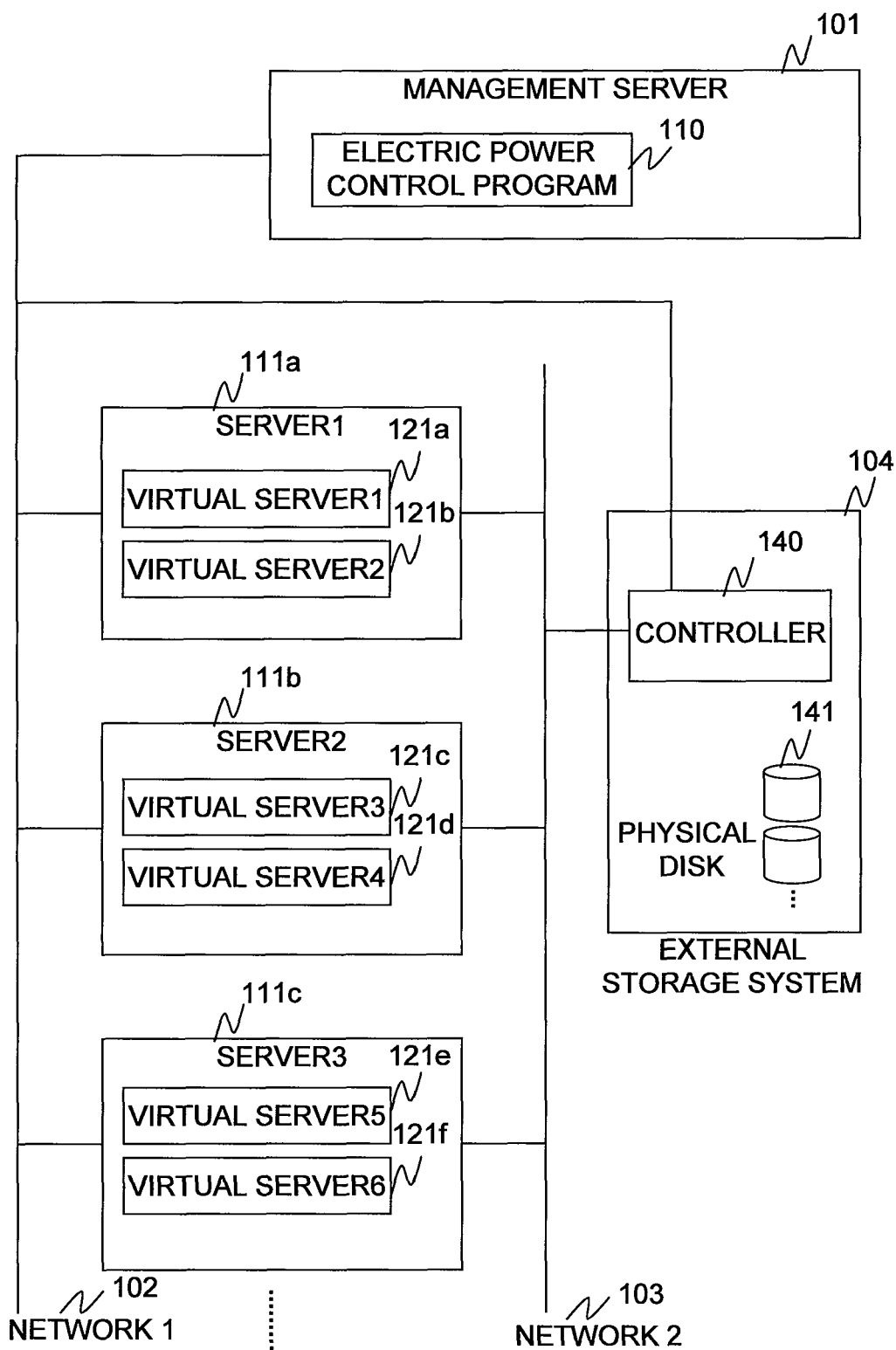
FIG. 33 is a block diagram showing a configuration of a computer system in accordance with a ninth embodiment of this invention.

FIG. 33 is a block diagram of a configuration of the computer system according to the ninth embodiment of this invention. The ninth embodiment is different from the first embodiment in that the servers 111 include virtual servers 121. According to the ninth embodiment of this invention, multiple OSs or application programs operate independently on the respective virtual servers 121 on the servers 111.

FIG. 34 describes the server management table 610 according to the ninth embodiment of this invention. The ninth embodiment is different from the first embodiment of this invention in physical server identifiers 704 and virtual server identifiers 705. The physical server identifier 704 is an identifier of a physical server 111. The virtual server identifier 705 is an identifier of a virtual server 121 operating on the physical server 111 identified by the physical server identifier 704. The identifier of the server 111 according to the first embodiment of this invention corresponds to an identifier of a virtual server 121.

While the present invention has been described in detail and pictorially in the accompanying drawings, the present invention is not limited to such detail but covers various obvious modifications and equivalent arrangements, which fall within the purview of the appended claims.

What is claimed is:

1. An electric power control method of controlling electric power consumption of a computer system, the method being carried out on a computer system having at least one server and at least one data processing apparatus, wherein the computer system further having at least one management server for managing the at least one data processing apparatus, wherein the electric power control method comprises the steps of:

a relationship management step of managing a use relationship between the at least one server and the at least one data processing apparatus included in the computer system;

a state monitoring step of monitoring a change in a state of the at least one server;

an obtaining step of obtaining the electric power consumption of the computer system;

a relationship search step of searching for a related data processing apparatus in the use relationship with the at least one server;

a state determination step of obtaining a state of at least one related server in the use relationship with the related data processing apparatus, and determining whether the electric power consumption of the related data processing apparatus is to be changed or not based on the state of the at least one related server and the obtained electric power consumption of the computer system; and an electric power consumption control step of changing the electric power consumption of the related data processing apparatus, wherein:

the at least one data processing apparatus is an external storage system which comprises physical disks for storing data accessed by the at least one server, and on which a RAID group is logically created by a set of the physical disks;

the electric power consumption control module changes electric power consumption of the physical disks included in each of the RAID group;

the relationship management step includes a step of obtaining a use relationship between the at least one server and the RAID group accessed by the at least one server from the at least one server and the external storage system;

the external storage system can select more than two levels of electric power consumption states of the RAID group which correspond to different performance levels;

the at least one management server holds setting policies of states of the electric power consumption of the RAID group which is used by the at least one server according to the state change of the at least one server; and the electric power consumption control step includes a step of determining one of the set levels of the electric power consumption state of the RAID group based on the setting policies.

2. An electric power control method of controlling electric power consumption of a computer system, the method being carried out on a computer system having at least one server and at least one data processing apparatus, wherein the computer system further having at least one management server for managing the at least one data processing apparatus, wherein the electric power control method comprises the steps of:

a relationship management step of managing a use relationship between the at least one server and the at least one data processing apparatus included in the computer system;

a state monitoring step of monitoring a change in a state of the at least one server;

an obtaining step of obtaining the electric power consumption of the computer system;

a relationship search step of searching for a related data processing apparatus in the use relationship with the at least one server;

a state determination step of obtaining a state of at least one related server in the use relationship with the related data processing apparatus, and determining whether the electric power consumption of the related data processing apparatus is to be changed or not based on the state of the at least one related server and the obtained electric power consumption of the computer system;

an electric power consumption control step of changing the electric power consumption of the related data processing apparatus;

the at least one data processing apparatus is an external storage system which comprises physical disks for storing data accessed by the at least one server, and on which a RAID group is logically created by a set of the physical disks;

the electric power consumption control module changes electric power consumption of the physical disks included in each of the RAID group;

the relationship management step includes a step of obtaining a use relationship between the at least one server and the RAID group accessed by the at least one server from the at least one server and the external storage system;

the at least one management server holds update policies of states of the electric power consumption according to the state change of the server;

the state determination step includes steps of updating a use state of the related data processing apparatus based on the update policies of states of the electric power consumption corresponding to the state of the at least one server, and determining whether to set or reset the power saving state of the related data processing apparatus based on a number of the at least one server which uses the related data processing apparatus; and the electric power consumption control step includes a step of instructing the related data processing apparatus to set or to reset the power saving state based on the determination of whether the power saving state is set or reset.

3. An electric power control method for a computer system of controlling electric power consumption of a computer system, the method being carried out on a computer system having at least one server and at least one data processing apparatus, wherein the computer system further having at least one management server for managing the at least one data processing apparatus, wherein the electric power control method comprises the steps of:

a relationship management step of managing a use relationship between the at least one server and the at least one data processing apparatus included in the computer system;

a state monitoring step of monitoring a change in a state of the at least one server;

an obtaining step of obtaining the electric power consumption of the computer system;

a relationship search step of searching for a related data processing apparatus in the use relationship with the at least one server;

a state determination step of obtaining a state of at least one related server in the use relationship with the related data processing apparatus, and determining whether the electric power consumption of the related data processing apparatus is to be changed or not based on the state of the at least one related server and the obtained electric power consumption of the computer system;

an electric power consumption control step of changing the electric power consumption of the related data processing apparatus;

the at least one data processing apparatus is an external storage system which comprises physical disks for storing data accessed by the at least one server, and on which a RAID group is logically created by a set of the physical disks;

the electric power consumption control module changes electric power consumption of the physical disks included in each of the RAID group;

the relationship management step includes a step of obtaining a use relationship between the at least one server and the RAID group accessed by the at least one server from the at least one server and the external storage system, further comprising a state change restraining step of restraining a change in the state of the at least one server; and the state change restraining step comprises temporarily stopping the change of the state of the at least one server in a case where the state of the at least one server changes, and resuming the change of the state of the at least one server after the RAID group in the use relationship with the at least one server becomes operable.

4. An electric power control method of controlling electric power consumption of a computer system, the method being carried out on a computer system having at least one server and at least one data processing apparatus, wherein the computer system further having at least one management server for managing the at least one data processing apparatus, wherein the electric power control method comprises the steps of:

a relationship management step of managing a use relationship between the at least one server and the at least one data processing apparatus included in the computer system;

a state monitoring step of monitoring a change in a state of the at least one server;

an obtaining step of obtaining the electric power consumption of the computer system;

a relationship search step of searching for a related data processing apparatus in the use relationship with the at least one server;

a state determination step of obtaining a state of at least one related server in the use relationship with the related data processing apparatus, and determining whether the electric power consumption of the related data processing apparatus is to be changed or not based on the state of the at least one related server and the obtained electric power consumption of the computer system;

an electric power consumption control step of changing the electric power consumption of the related data processing apparatus;

the at least one data processing apparatus is an external storage system which comprises physical disks for storing data accessed by the at least one server, and on which a RAID group is logically created by a set of the physical disks;

the electric power consumption control module changes electric power consumption of the physical disks included in each of the RAID group;

the relationship management step includes a step of obtaining a use relationship between the at least one server and the RAID group accessed by the at least one server from the at least one server and the external storage system;

the at least one management server holds at least one of power ON time and power OFF time of the at least one server which operates according to a predetermined schedule; and the electric power consumption control step includes a step of instructing to reset the power saving state of the RAID group which is used by the at least one server before a necessary time period to reset the power saving state from the power ON time according to the predetermined schedule.

5. An electric power control method of controlling electric power consumption of a computer system, the method being carried out on a computer system having at least one server and at least one data processing apparatus, wherein the computer system further having at least one management server for managing the at least one data processing apparatus, wherein the electric power control method comprises the steps of:

a relationship management step of managing a use relationship between the at least one server and the at least one data processing apparatus included in the computer system;

a state monitoring step of monitoring a change in a state of the at least one server;

an obtaining step of obtaining the electric power consumption of the computer system;

a relationship search step of searching for a related data processing apparatus in the use relationship with the at least one server;

a state determination step of obtaining a state of at least one related server in the use relationship with the related data processing apparatus, and determining whether the electric power consumption of the related data processing apparatus is to be changed or not based on the state of the at least one related server and the obtained electric power consumption of the computer system;

an electric power consumption control step of changing the electric power consumption of the related data processing apparatus;

each of the at least one server has an electric power consumption controlling unit for controlling the electric power consumption of the server and the related data processing apparatus, and an electric power consumption measuring unit for measuring the electric power consumption of the server and the related data processing apparatus;

the management server holds a target electric power consumption of a whole or a part of the computer system; and the state determination step includes steps of determining to change the electric power consumption of the related data processing apparatus based on the target electric power consumption and a measured electric power consumption of the server and the related data processing apparatus.

6. The electric power control method for a computer system according to claim 5, wherein:

the state change restraining step includes the steps of:

predicting, if the state of the at least one server changes, and the electric power consumption of the related data processing apparatus in the use relationship with the at least one server is changed, electric power consumption of at least one of each server and each data processing apparatus included in the computer system based on the measured electric power consumption; and preventing, in a case where the measured electric power consumption exceeds the target electric power consumption, changes in the electric power consumptions of at least one of the at least one server and the related data processing apparatus.

7. A non-transitory computer-readable medium, containing at least one sequence of instructions for controlling electric power consumption of a computer system having a processor, the sequence of instructions, when executed, causes the processor to:

obtain the electric power consumption of the computer system;

obtain use relationships between each server and each RAID group included in the computer system;

monitor a change in a state of each server;

search for a related RAID group in the use relationship with each server;

obtain a state of a related server in the use relationship with the related RAID group to determine whether the electric power consumption of the related RAID group is to be changed or not based on the state of the related server and the obtained electric power consumption of the computer system; and change the electric power consumption of the related RAID group, wherein the processor is further caused to update a use state of the related RAID group based on update policies of states of the electric power consumption corresponding to the state of the at least one related server, and to determine whether to set or reset the power saving state of the related RAID group based on a number of the at least one server which uses the related RAID group; and wherein the processor is further caused to instruct the related RAID group to set or to reset the power saving state based on determining whether to set or reset the power saving state.

8. A non-transitory computer-readable medium, containing at least one sequence of instructions for controlling electric power consumption of a computer system having a processor, the sequence of instructions, when executed, causes the processor to:

obtain the electric power consumption of the computer system;

obtain use relationships between each server and each RAID group included in the computer system;

monitor a change in a state of each server;

search for a related RAID group in the use relationship with each server;

obtain a state of a related server in the use relationship with the related RAID group to determine whether the electric power consumption of the related RAID group is to be changed or not based on the state of the related server and the obtained electric power consumption of the computer system; and change the electric power consumption of the related RAID group wherein the processor is further caused to predict, if the state of the at least one related server changes, and the electric power consumption of the related RAID group in the use relationship with the at least one server is changed, electric power consumption of at least one of each server and each RAID group included in the computer system based on a measured electric power consumption; and wherein the processor is further caused to prevent, in a case where the measured electric power consumption exceeds the target electric power consumption, changes in the electric power consumptions of at least one of the at least one server and the related RAID group.

9. A computer system for controlling electric power consumption comprising at least one server, at least one external storage system having at least one RAID group configured thereon, and at least one management server for managing the external storage system, wherein:

the at least one external storage system has an electric power consumption state control module which changes electric power consumption of a RAID group, and the at least one management server has:

a state obtaining module for obtaining the electric power consumption of the computer system;

a relationship management module for obtaining a use relationship between each server and each RAID group included in the computer system;

a state monitoring module for monitoring a change in a state of the server;

a relationship search module for searching for a related RAID group in the use relationship with the server;

a state determination module for obtaining a state of at least one related server in the use relationship with the related RAID group, and determining whether the electric power consumption of the related RAID group is to be changed or not based on the state of the related server and the obtained electric power consumption of the computer system; and an electric power consumption control module for changing the electric power consumption of the related RAID group, wherein:

the at least one data processing apparatus is the external storage system which has a plurality of physical disks for storing data accessed by the at least one server, and on which each RAID group is logically created by a set of the physical disks;

the electric power consumption state control module changes electric power consumption of the physical disks included in each RAID group;

the relationship management module obtains a use relationship between the at least one server and the RAID group accessed by the at least one server;

the external storage system can select more than two levels of electric power consumption states of the RAID group which correspond to different performance levels;

the at least one management server holds setting policies of states of the electric power consumption of the RAID group which is used by the at least one server according to the state change of the least one server; and the electric power consumption state control module determines one of the levels of the electric power consumption state of the RAID group based on the setting policies.

10. A computer system for controlling electric power consumption comprising at least one server, at least one external storage system having at least one RAID group configured thereon, and at least one management server for managing the external storage system, wherein:

the at least one external storage system has an electric power consumption state control module which changes electric power consumption of a RAID group, and the at least one management server has:

a state obtaining module for obtaining the electric power consumption of the computer system;

a relationship management module for obtaining a use relationship between each server and each RAID group included in the computer system;

a state monitoring module for monitoring a change in a state of the server;

a relationship search module for searching for a related RAID group in the use relationship with the server;

a state determination module for obtaining a state of at least one related server in the use relationship with the related RAID group, and determining whether the electric power consumption of the related RAID group is to be changed or not based on the state of the related server and the obtained electric power consumption of the computer system; and an electric power consumption control module for changing the electric power consumption of the related RAID group, wherein:

the at least one data processing apparatus is the external storage system which has a plurality of physical disks for storing data accessed by the at least one server, and on which each RAID group is logically created by a set of the physical disks;

the electric power consumption state control module changes electric power consumption of the physical disks included in each RAID group;

the relationship management module obtains a use relationship between the at least one server and the RAID group accessed by the at least one server;

the at least one management server holds update policies of states of the RAID group according to the state change of the at least one server;

the state determination module updates a use state of the related RAID group based on the update policies of states of the electric power consumption corresponding to the state of the at least one server, and determining whether to set or reset the power saving state of the related RAID group based on a number of the at least one server which uses the related RAID group; and the electric power consumption state control module instructs the related RAID group to set or to reset the power saving state based on the determination of the set or the reset of the power saving state.

11. A computer system for controlling electric power consumption comprising at least one server, at least one external storage system having at least one RAID group configured thereon, and at least one management server for managing the external storage system, wherein:

the at least one external storage system has an electric power consumption state control module which changes electric power consumption of a RAID group, and the at least one management server has:

a state obtaining module for obtaining the electric power consumption of the computer system;

a relationship management module for obtaining a use relationship between each server and each RAID group included in the computer system;

a state monitoring module for monitoring a change in a state of the server;

a relationship search module for searching for a related RAID group in the use relationship with the server;

a state determination module for obtaining a state of at least one related server in the use relationship with the related RAID group, and determining whether the electric power consumption of the related RAID group is to be changed or not based on the state of the related server and the obtained electric power consumption of the computer system; and an electric power consumption control module for changing the electric power consumption of the related RAID group, wherein;

the at least one data processing apparatus is the external storage system which has a plurality of physical disks for storing data accessed by the at least one server, and on which each RAID group is logically created by a set of the physical disks;

the electric power consumption state control module changes electric power consumption of the physical disks included in each RAID group;

the relationship management module obtains a use relationship between the at least one server and the RAID group accessed by the at least one server;

the at least one management server further comprises a state change restraining module for restraining a change in the state of the at least one server; and the state change restraining module temporarily stops the change of the state of the at least one server in a case where the state of the at least one server changes, and resuming the change of the state of the at least one server after the RAID group in the use relationship with the at least one server becomes operable.

12. A computer system for controlling electric power consumption comprising at least one server, at least one external storage system having at least one RAID group configured thereon, and at least one management server for managing the external storage system, wherein:

the at least one external storage system has an electric power consumption state control module which changes electric power consumption of a RAID group, and the at least one management server has:

a state obtaining module for obtaining the electric power consumption of the computer system;

a relationship management module for obtaining a use relationship between each server and each RAID group included in the computer system;

a state monitoring module for monitoring a change in a state of the server;

a relationship search module for searching for a related RAID group in the use relationship with the server;

a state determination module for obtaining a state of at least one related server in the use relationship with the related RAID group, and determining whether the electric power consumption of the related RAID group is to be changed or not based on the state of the related server and the obtained electric power consumption of the computer system; and an electric power consumption control module for changing the electric power consumption of the related RAID group, wherein:

the at least one data processing apparatus is the external storage system which has a plurality of physical disks for storing data accessed by the at least one server, and on which each RAID group is logically created by a set of the physical disks;

the electric power consumption state control module changes electric power consumption of the physical disks included in each RAID group;

the relationship management module obtains a use relationship between the at least one server and the RAID group accessed by the at least one server;

the at least one management server holds at least one of power on time and power off time of the at least one server which operates according to a predetermined schedule; and the electric power consumption state control method instructs to reset the power saving state of the RAID group which is used by the at least one server before a necessary time period to reset the power saving state from the power on time according to the predetermined schedule.

13. A computer system for controlling electric power consumption comprising at least one server, at least one external storage system having at least one RAID group configured thereon, and at least one management server for managing the external storage system, wherein:

the at least one external storage system has an electric power consumption state control module which changes electric power consumption of a RAID group, and the at least one management server has:

a state obtaining module for obtaining the electric power consumption of the computer system;

a relationship management module for obtaining a use relationship between each server and each RAID group included in the computer system;

a state monitoring module for monitoring a change in a state of the server;

a relationship search module for searching for a related RAID group in the use relationship with the server;

a state determination module for obtaining a state of at least one related server in the use relationship with the related RAID group, and determining whether the electric power consumption of the related RAID group is to be changed or not based on the state of the related server and the obtained electric power consumption of the computer system; and an electric power consumption control module for changing the electric power consumption of the related RAID group, wherein:

the management server further includes a state change restraining module for predicting, if the state of the at least one server changes, and the electric power consumption of the related RAID group in the use relationship with the at least one server is changed, electric power consumption of at least one of each server and each RAID group included in the computer system based on a measured electric power consumption; and the management server further includes a state change restraining module further for preventing, in a case where the measured electric power consumption exceeds a target electric power consumption, changes in the electric power consumptions of at least one of the at least one server and the related RAID group.

* * * * *